(12) United States Patent
Oh et al.

(10) Patent No.: US 11,361,461 B2
(45) Date of Patent: Jun. 14, 2022

(54) ELECTRONIC DEVICE AND OBJECT MEASUREMENT METHOD THEREOF

(71) Applicant: Samsung Electronics Co., Ltd., Gyeonggi-do (KR)

(72) Inventors: Dongkeun Oh, Gyeonggi-do (KR); Jisung Yoo, Gyeonggi-do (KR); Beomsu Kim, Gyeonggi-do (KR); Chanmin Park, Gyeonggi-do (KR); Kihuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 16/792,401

(22) Filed: Feb. 17, 2020

(65) Prior Publication Data

US 2020/0265600 A1  Aug. 20, 2020

(30) Foreign Application Priority Data

Feb. 19, 2019  (KR) .......................... 10-2019-0019536

(51) Int. Cl.
*G06T 7/60*  (2017.01)
(52) U.S. Cl.
CPC ...... *G06T 7/60* (2013.01); *G06T 2207/10024* (2013.01); *G06T 2207/10028* (2013.01)
(58) Field of Classification Search
CPC ............. G06T 7/60; G06T 2207/10024; G06T 2207/10028
USPC ......................................................... 382/154
See application file for complete search history.

(56) References Cited

U.S. PATENT DOCUMENTS

| | | | |
|---|---|---|---|
| 10,096,131 | B2 | 10/2018 | Driegen et al. |
| 10,147,135 | B2 | 12/2018 | Wishne et al. |
| 10,176,625 | B2 | 1/2019 | Bridges |
| 2015/0042791 | A1 | 2/2015 | Metois et al. |
| 2016/0005211 | A1 | 1/2016 | Sarkis et al. |
| 2017/0103510 | A1 | 4/2017 | Wang et al. |
| 2017/0154127 | A1* | 6/2017 | Madmony ........... G06F 16/5854 |

(Continued)

FOREIGN PATENT DOCUMENTS

CN   108848325 A  * 11/2018

OTHER PUBLICATIONS

International Search Report dated May 25, 2020.
(Continued)

*Primary Examiner* — Wednel Cadeau
(74) *Attorney, Agent, or Firm* — Cha & Reiter, LLC

(57) ABSTRACT

According to an embodiment, an electronic device includes a display, a memory, and a processor operatively connected to the display and the memory. The memory stores instructions that cause the processor to generate first depth information in a first direction from an object, generate a first point cloud of the object based on the first depth information, generate a first bounding box containing one or more points of the first point cloud, generate second depth information in a second direction from the object, the second direction being different from the first direction, generate a second point cloud of the object based on the second depth information, generate a second bounding box containing one or more points of the second point cloud, generate a third bounding box by combining the first and second bounding boxes, and display the third bounding box on the display. Certain other embodiments are also possible.

20 Claims, 19 Drawing Sheets

(56) References Cited

U.S. PATENT DOCUMENTS

| | | |
|---|---|---|
| 2017/0337704 A1 | 11/2017 | Williams et al. |
| 2017/0372527 A1* | 12/2017 | Murali ..................... G06T 7/38 |
| 2018/0253857 A1 | 9/2018 | Driegen et al. |
| 2019/0026878 A1 | 1/2019 | Jovanovski et al. |

OTHER PUBLICATIONS

European Search Report dated Jul. 7, 2020.
MeasureKit—AR ruler app for iOS 11 <URL: https://www.youtube.com/watch?time_continue=140&v=nQpEWv9_6Cg>.

* cited by examiner

ELECTRONIC DEVICE AND OBJECT MEASUREMENT METHOD THEREOF

CROSS-REFERENCE TO RELATED APPLICATION(S)

This application is based on and claims priority under 35 U.S.C. 119 to Korean Patent Application No. 10-2019-0019536 filed on Feb. 19, 2019, in the Korean Intellectual Property Office, the disclosures of which are herein incorporated by reference in their entireties.

TECHNICAL FIELD

The instant disclosure generally relates to an electronic device and, in particular, to an electronic device that is capable of measuring the size of an object using information of neighboring objects.

BACKGROUND

Using augmented reality technology, a 3-dimensional virtual image may be superimposed on a real-world background image captured by a camera, and the combined image may be provided to the user. A portable electronic device (hereinafter, referred to as "electronic device") such as a smartphone can be designed to provide users with various types of content based on augmented reality technology.

An exemplary application of the augmented reality technology is to provide information on a real-world object using virtual images. One such type of information on the real-world object is the size of the object. For example, the user may acquire size information on a box for packing a cup using the electronic device that is capable of taking an image of the cup, measuring the size of the cup from the image, and displaying the size information of the box.

SUMMARY

Conventionally, object size measurement may be achieved by measuring a distance between points designated by the user on a captured real-world image. For example, when the electronic device displays a preview image from its camera, the user may sequentially select the top and bottom end points of an object to measure the distance between the two selected points. The size of the object may then be determined based on the result of the measurement.

Additional aspects will be set forth in part in the description which follows and, in part, will be apparent from the description, or may be learned by practice of the presented embodiments.

According to a disclosed embodiment, an electronic device includes a display, a memory, and a processor operatively connected to the display and the memory. The memory stores instructions that, when executed by the processor, cause the processor to generate first depth information in a first direction from an object, generate a first point cloud of the object based on the first depth information, generate a first bounding box containing one or more points of the first point cloud, generate second depth information in a second direction from the object, the second direction being different from the first direction, generate a second point cloud of the object based on the second depth information, generate a second bounding box containing one or more points of the second point cloud, generate a third bounding box by combining the first and second bounding boxes, and display the third bounding box on the display.

According to a disclosed embodiment, an object measurement method of an electronic device includes generating first depth information in a first direction from an object, generating a first point cloud of the object based on the first depth information, generating a first bounding box containing one or more points of the first point cloud, generating second depth information in a second direction from the object, the second direction being different from the first direction, generating a second point cloud of the object based on the second depth information, generating a second bounding box containing one or more points of the second point cloud, generating a third bounding box by combining the first and second bounding boxes, and displaying the third bounding box.

BRIEF DESCRIPTION OF THE DRAWINGS

In the drawings, the same or similar reference numerals may be used for the same or similar components.

The above and other aspects, features, and advantages of certain embodiments of the present disclosure will be more apparent from the following description taken in conjunction with the accompanying drawings, in which.

DETAILED DESCRIPTION

Certain disclosed embodiments aim to provide an electronic device and object measurement method thereof that is capable of automatically and accurately measuring the size of a real-world object.

Figure 1:
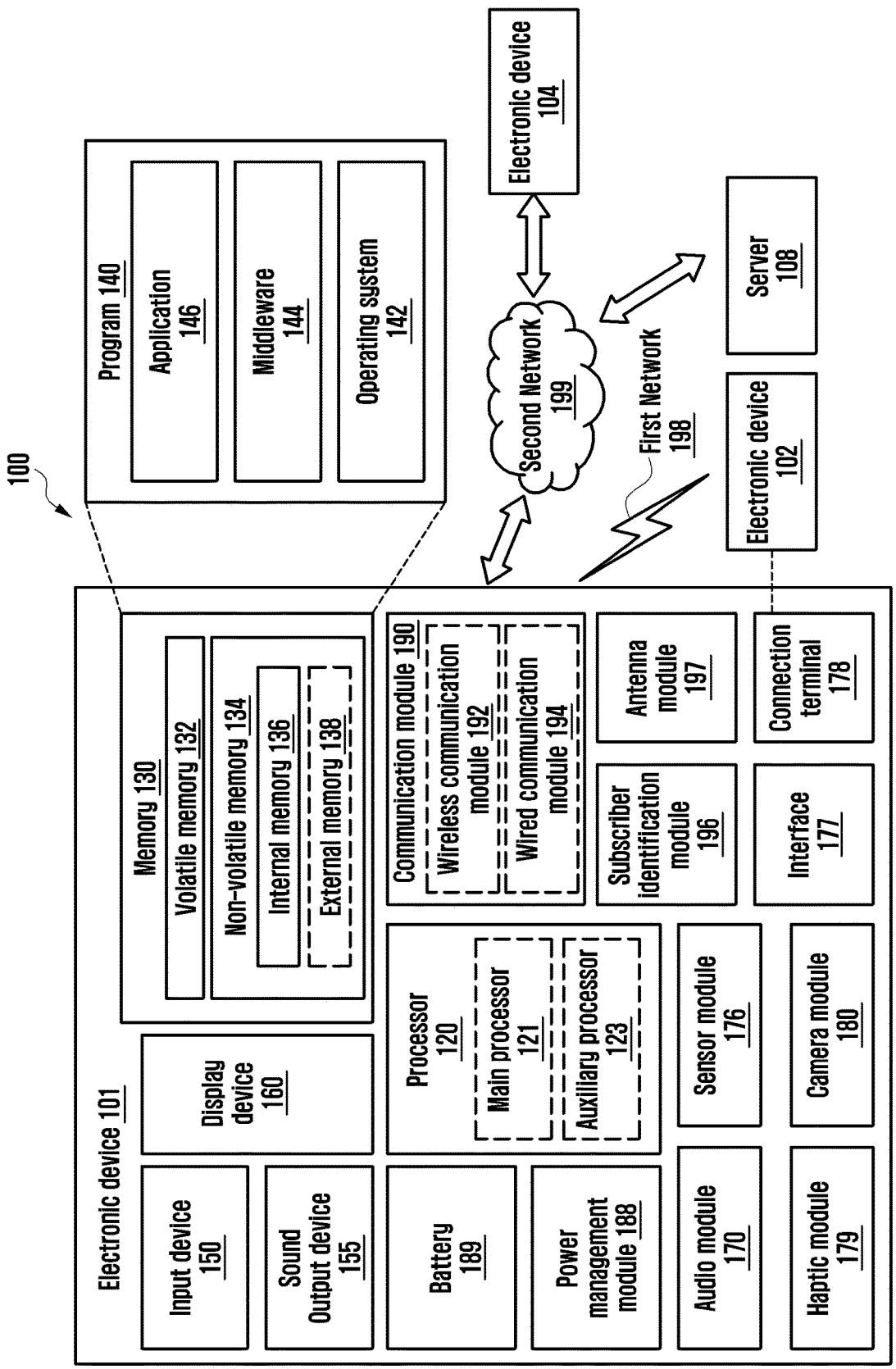
FIG. 1 is a block diagram illustrating a configuration of an electronic device in a network environment according to a disclosed embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
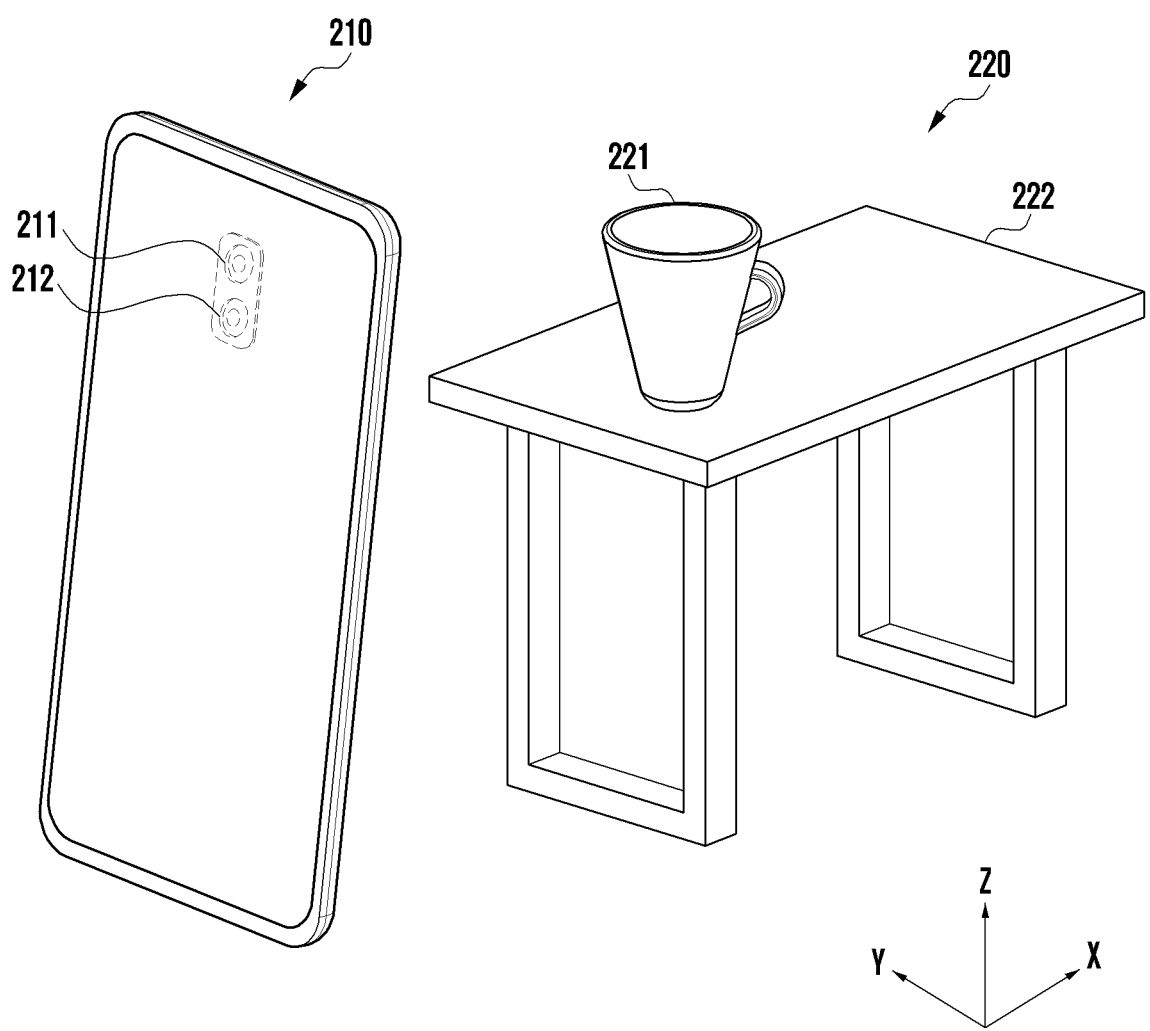
FIG. 2 is a diagram illustrating an electronic device and an object according to a disclosed embodiment.

FIG. 2 is a diagram illustrating an electronic device and an object according to a disclosed embodiment.

According to an embodiment, the electronic device 210 may be, but it is not limited to, a portable electronic device such as a smartphone and a tablet personal computer (PC). The electronic device 210 may include at least one sensor (e.g., time of flight (ToF) sensor 211 and red green blue (RGB) image sensor 212) for taking images within a predetermined view angle and creating depth information (or depth map) of an object 220 included in the taken image.

A method for the electronic device 210 to generate the depth information of the object 220 using the ToF sensor 211 and/or the RGB image sensor 212 is described in detail with reference to FIGS. 3 to 14.

The object 220 of which the depth information can be obtained is not limited by the embodiment shown in FIG. 2. Although FIG. 2 is directed to an example of taking an image of a cup 221 placed on a table 222, the electronic device 210 may also take images of other objects such as human bodies to obtain the depth information of the objects.

Although the description in the instant disclosure is directed to the exemplary case of obtaining the depth information of the cup 221 in the taken image and automatically displaying a bounding box and size of the cup 221 that is automatically measured based on the depth information (e.g., FIGS. 5 to 12), the methods of the certain disclosed embodiments may be used for measuring sizes of various types of 3-dimensional or 2-dimensional objects (e.g., pictures drawn on flat surfaces).

The electronic device 210 may create a point cloud based on the depth information of the object 220 in the taken image and proceed to create a bounding box of the point cloud.

According to an embodiment, the electronic device 210 may create multiple point clouds (e.g., first point cloud and second point cloud) based on the depth information (e.g., first depth information and second depth information) obtained at two or more locations (e.g., first direction and second direction), create multiple bounding boxes (e.g., first to third bounding boxes) from the point clouds, and display the bounding boxes.

After displaying the created bounding boxes, if it is determined that a bounding box is inaccurate, the electronic device 210 may display guide information prompting the user to move the electronic device 210 to take an additional image (or depth information) of the corresponding object 220 at a different location.

Figure 3:
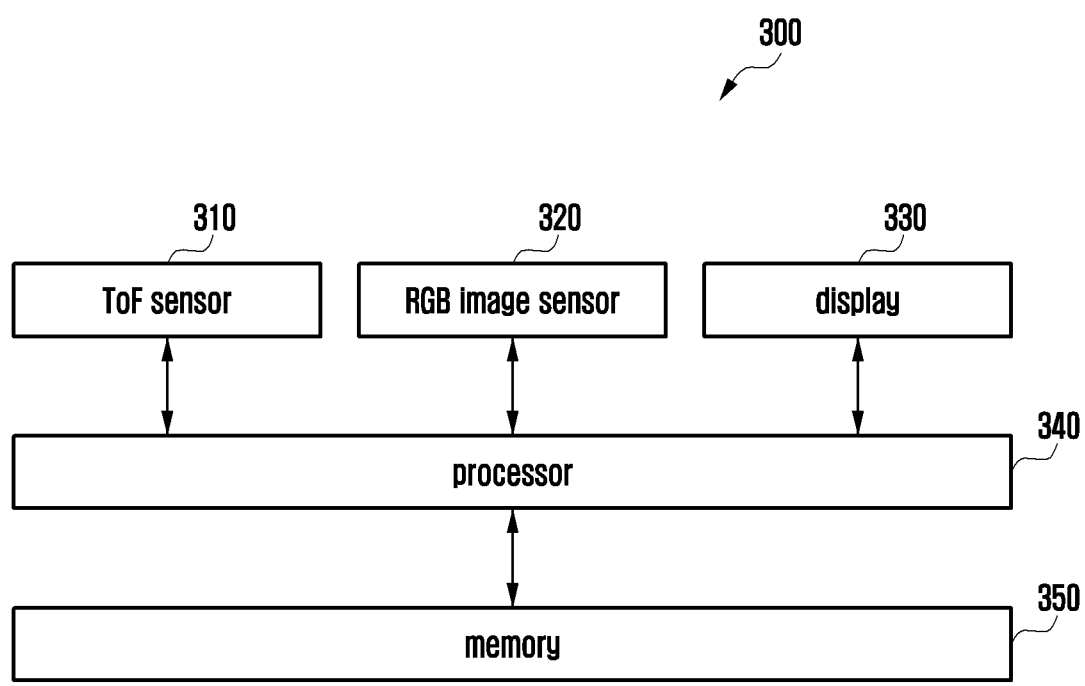
FIG. 3 is a block diagram illustrating an electronic device according to a disclosed embodiment.

FIG. 3 is a block diagram illustrating an electronic device according to a disclosed embodiment.

In reference to FIG. 3, the electronic device 300 may include a ToF sensor 310, an RGB sensor 320, a display 330, a processor 340, and a memory 350 of which at least one may be omitted or replaced. The electronic device 300 may include at least some of the configuration and/or functionality of the electronic device of FIG. 1.

The components constituting the electronic device 300 are contained in a housing, and some components that emit (e.g., display 330) light or receive (e.g., ToF sensor 310) light from the exterior of the housing may be partially exposed to the outside of the housing.

According to an embodiment, the display 330 may display images and may be implemented with at least one of various types of display devices such as liquid crystal display (LCD) or light-emitting diode (LED) display. The display 330 may include at least part of the configuration and/or functionality of the display device 160 of FIG. 1. The display 330 may be exposed through an opening formed in one surface (e.g., front surface) of the housing.

The display 330 may be a touchscreen display that is capable of sensing touches or hovering (i.e. proximity touch) gestures made by, for example, one or more fingers of the user or by a stylus pen.

According to an embodiment, the ToF sensor 310 is capable of obtaining depth information of an object using ToF technology. For example, the ToF sensor 310 may emit infrared rays and calculate the times of arrival of the rays reflected from the object to measure the distances from the ToF sensor 310 to the parts of the object reflecting the light. Based on the distances measured by the ToF sensor 310, it is possible generate depth information of the object.

The ToF sensor 310 may generate depth information from multiple image frames acquired from multiple locations in multiple directions using ToF technology.

According to an embodiment, the RGB image sensor 320 may take images of an object and generate image data including red (R), green (G), and blue (blue) data. The RGB image sensor 320 may acquire the image data using one of various technologies such as charge coupled device (CCD) and complementary metal oxide semiconductor (CMOS).

According to an embodiment, the processor 340 may generate depth information of the object based on two pieces of image data of the object that are acquired by the RGB image sensor in different directions.

According to an embodiment, the electronic device 300 may include at least one of the ToF sensor 310 and the RGB image sensor 320 and/or may include an additional sensor that is capable of generating depth information of the object in addition to the ToF sensor 310 and the RGB sensor 320.

According to an embodiment, the memory may include, but it is not limited to, volatile and non-volatile memories. The memory 350 may include at least some of the configuration and/or functionality of the memory of FIG. 1. The memory 350 may also store at least some of programs of FIG. 1.

The memory 350 may store various instructions executable by the processor 340. The instructions may include arithmetic and logic operations, instructions for manipulating data, and input/output control commands.

According to an embodiment, the processor 340 may be configured to control the components of the electronic device 300 to perform communication-related operations and data processing operations and may include at least some of the configurations and/or functionality of the processor 120 of FIG. 1. The processor 340 may be functionally, operatively, and/or electrically connected to the components of the electronic device 300, i.e., the ToF sensor 310, the RGB image sensor 320, the display 330, and the memory 350. The processor 340 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 340 are not limited to perform arithmetic operations and data processing functions of the electronic device 300. Certain disclosed embodiments are directed to a method for automatically and accurately measuring the size of a real-world object and guide the user to a more accurate measurement method. The operations of the processor 340 to be described below may be performed after corresponding instructions stored in the memory 350 are loaded.

According to an embodiment, the processor 340 may generate first depth information in a first direction from the object.

According to an embodiment, the processor 340 may generate the first depth information based on a first ToF frame taken by the ToF sensor 310 located in the first direction from the object. The ToF sensor 310 may measure distances between points of each object located within a view angle, and the processor 340 may generate the first depth information based on the distances.

According to an alternative embodiment, the processor 340 may generate the first depth information based on the difference between a third RGB frame that the RGB image sensor 320 acquires in a third direction from the object and a first RGB frame that the RGB image sensor 320 acquires in the first direction from the object. The first and third directions from the object may form a predetermined angle, and thus the first and third RGB frames may be image frames taken in different directions from the object. Accordingly, the processor 340 may acquire the first depth information of the object based on the difference between the first and third RGB frames acquired in different directions from the object.

According to an embodiment, the processor 340 may generate a first point cloud of the object based on the first depth information. A point cloud include points captured on the surface of the 3-dimensional object. The individual points constituting the point cloud may be identified by coordinate information relative to a reference point.

According to an embodiment, the processor 340 may generate a first point cloud with only the points above a reference surface. That is, in the generated point cloud, the processor 340 may remove the points on the reference surface.

In the case of measuring an object placed on a specific reference surface (e.g., table and ground), because the reference surface is included in the image frames (e.g., ToF frame and RGB image frame), the depth information and point cloud of the reference surface may be included. The processor 340 may remove the point cloud of the reference surface to generate a bounding box for only the object.

According to an embodiment, the processor 340 may detect points having the same normal vector (or being within an error range) among the points constituting the point cloud. The processor 340 may then identify the points adjacent to each other, among the points having the same normal vector, based on their coordinate information. According to an alternative embodiment, the processor 340 may determine a surface having the largest number of points with the same coordinate value in the z axis (e.g., z axis in FIG. 2) as the reference surface in the generate point cloud.

By removing the reference surface detected as above, it is possible to generate the first point cloud composed of the points corresponding to the object. In the case where multiple objects exist in a taken image frame (e.g., ToF frame and RGB image frame), the objects may be separated by removing the reference surface. The processor 340 may generate point clouds and bounding boxes for the separated objects.

According to an embodiment, the processor 340 may generate a first bounding box based on the first point cloud. A bounding box is formed as the smallest cuboid that the object can fit in. For example, the processor 340 may generate the first bounding box based on the smallest and largest coordinate values in the x, y, and z axes that are obtained from the coordinate information of the individual points of the first point cloud.

According to an embodiment, in the case where multiple point clouds are generated for multiple objects included in the taken image frame (e.g., ToF frame and RGB image frame), due to the removal of the reference surface, the processor 340 may generate a bounding box for each object.

According to an embodiment, the processor may display the first bounding box on the display 330. Here, the processor 340 may display the first bounding box such that the first bounding box is overlaid on the image of the object that is taken by the RGB image sensor 320. In the case where there are multiple objects, bounding boxes for each object are overlaid on the respective objects.

The first bounding box generated as above may be inaccurate because it is generated based on only one set of depth information. The accuracy is low because it is difficult to measure 3-D depth information from only the first direction. According to a disclosed embodiment, the electronic device 300 may calculate a bounding box and numerical values more accurately using multiple sets of depth information acquired in different directions.

According to an embodiment, the processor 340 may generate second depth information in a second direction from the object. Here, the second direction differs from the first direction and may form a predetermined angle with the first direction horizontally or vertically with respect to the object.

The second depth information may be generated in the same manner as that used for the first depth information. For example, the processor 340 may generate the second depth information based on a second ToF frame acquired by the ToF sensor 310 in the second direction from the object. The processor 340 may also generate the second depth information based on the difference between the first RGB frame that the RGB sensor 320 acquires in the first direction from the object and a second RGB frame that the RGB image sensor 320 acquires in the second direction from the object.

According to an embodiment, the processor 340 may generate a second point cloud of the object based on the second depth information. The processor 340 may generate the second point cloud with only the points above a reference surface among the point cloud generated based on the second depth information.

According to an embodiment, the processor 340 may generate a second bounding box based on the second point cloud. The second bounding box may differ in part from the first bounding box. For example, the second bounding box may have a dimension extended (or shrunken) in the x, y, and z directions with respect to the first bounding box. Here, the processor 340 may display the second bounding box such that the second bounding box is overlaid on the image of the object that is taken by the RGB image sensor 320.

According to an embodiment, a third bounding box may be generated by combining the first and second bounding boxes. As described above, the first and second bounding boxes differ in size because they are measured in different directions from the object.

The third bounding box may have a shape of a cuboid that can fit the first and second bounding boxes. That is, the third bounding box may be generated based on the smallest and largest of the x-, y-, and z-axis coordinate values of the first and second bounding boxes.

According to an embodiment, the processor 340 may display the third bounding box on the display 330. The processor 340 may display the third bounding box such that the third bounding box is overlaid on the image of the object that is acquired by the RGB image sensor 320.

According to an embodiment, the processor 340 may display the third bounding box along with numeric information. The numeric information may include edge lengths and the volume of the third bounding box. The processor 340 may generate the numeric information based on the smallest and largest coordinate values of the point clouds contained in the third bounding box.

According to an embodiment, if it is determined that the first bounding box is inaccurate, the processor 340 may display guide information, which prompts for generation of another bounding box in a different direction, on the display 330.

According to an embodiment, if the first bounding box differs in part from a region where the actual object is included, the processor 340 may identify the first bounding box as inaccurate and display guide information prompting generation of the second bounding box in a different direction.

According to an alternative embodiment, if it is determined that the object extracted from the first RGB image is partly out of the viewing angle of the RGB image sensor 320, the processor 340 may display guide information prompting a shift in the location of the electronic device 300.

According to an alternative embodiment, if the number of the points constituting the first point clouds is less than a threshold, the processor 340 may display guide information prompting a shift in the location of the electronic device 300 closer to the object.

According to an alternative embodiment, if the number of first point clouds acquired from the first ToF frame taken by the ToF sensor 310 is less than a threshold, the processor 340 may display guide information prompting acquisition of depth information with the RGB image sensor 320.

How to display the guide information is described later with reference to FIGS. 9A to 9D.

According to an embodiment, the electronic device 300 may generate a bounding box for a 2-dimensional object (e.g., rectangle and ellipse) on a plane.

If it fails to detect any 3-dimensional objects in the image frames captured by the ToF sensor 310 and/or the RGB image sensor 320 or if the user selects a 2-dimensional object measurement option, the processor 340 may perform a process to acquire depth information of a 2-dimensional object.

The processor 340 may generate a point cloud based on the depth information of the 2-dimensional object and proceed to generate a point cloud mask by cropping the points forming the shape of the 2-dimensional object among the generated point cloud.

The processor 340 may calculate the smallest and largest x- and y-axis coordinate values of the points of the point cloud mask and generate a bounding box in the form of a 2-dimensional shape (e.g., rectangle) based on the calculated coordinate values.

The processor 340 may display the generated bounding box on the display 330 such that the bounding box is overlaid on the image of the object along with numeric information including the length of at least one side of the bounding box and/or the area of the bounding box.

Figure 4:
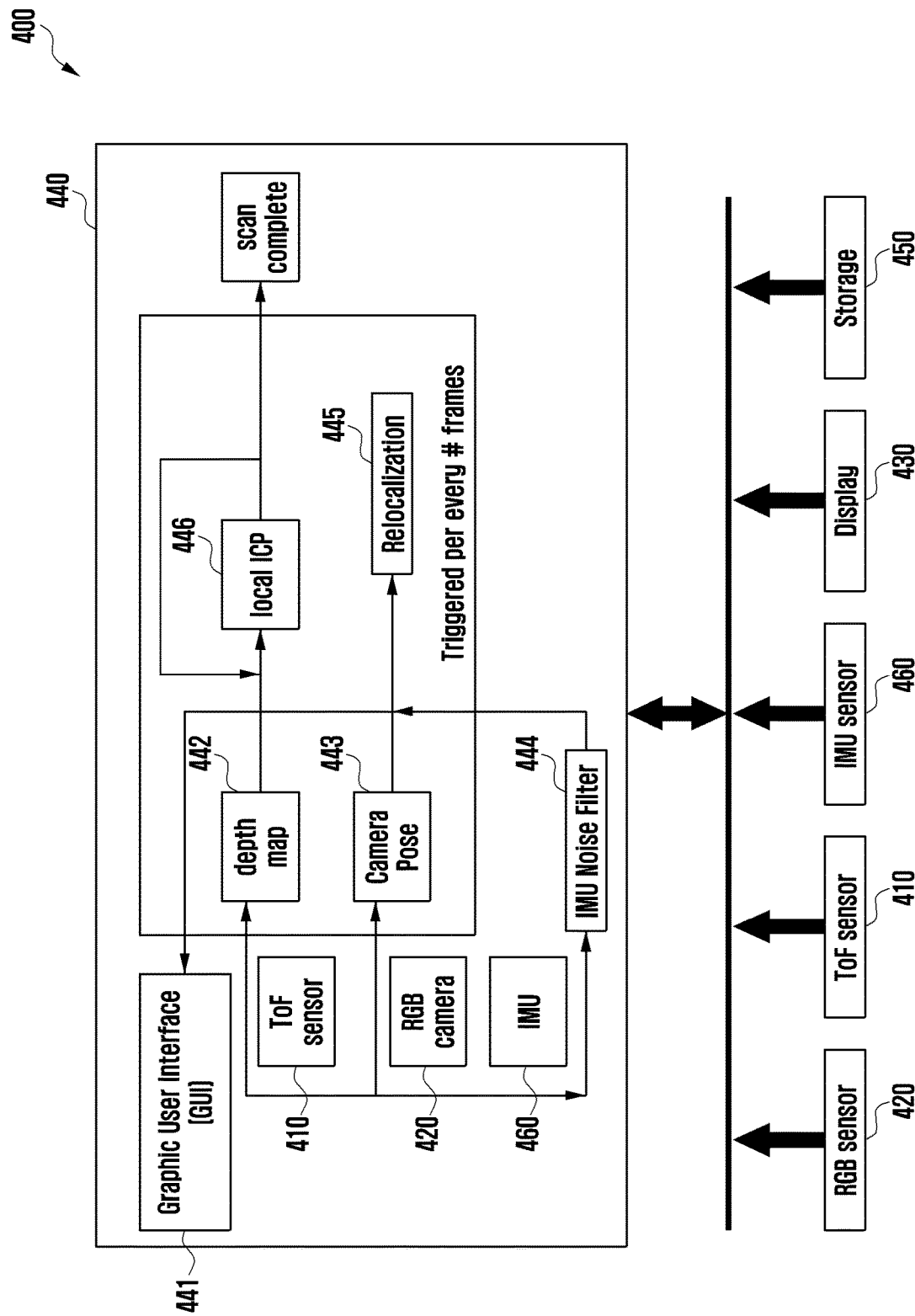
FIG. 4 is a block diagram illustrating hardware and software of an electronic device for generating 3-dimensional coordinates of an object according to a disclosed embodiment.

FIG. 4 is a block diagram illustrating hardware and software of an electronic device for generating 3-dimensional coordinates of an object according to a disclosed embodiment.

In reference to FIG. 4, the electronic device 400 may include the following hardware components: a processor 440, an RGB image sensor 420, a ToF sensor 410, an inertial measurement unit (IMU) sensor 460, a display 430, and a memory 450. The processor 440 may execute one or more processes or threads for generating a point cloud and/or bounding box of an object.

According to an embodiment, if the user opts to execute an object measurement function, the electronic device 400 may display an image of an object that is taken by the RGB image sensor 420, measurement information (e.g., point cloud, bounding box, and numeric information), and guide information through a graphic user interface 441.

The ToF sensor 410 may generate and send at least one ToF frame of the object to the processor 440, and the processor 440 may include a depth map generator 442 to generate depth information based on the ToF frame. The electronic device 400 may include additional sensors capable of generating the depth information.

The processor 440 may include a camera pose re-localizer 443 to re-localize a camera pose of the RGB image sensor 420.

The IMU sensor 460 may acquire various pieces of information related to the location and movement of the electronic device 400 such as rotation amount, acceleration, and location information of the electronic device 400 using at least one of a gyroscope, an accelerometer, and an electromagnetic sensor. The processor 440 may include an IMU noise filter 444 that is capable of filtering noise from information acquired by the IMU sensor 460.

The processor 440 may re-localize the camera pose by means of the camera pose re-localizer 443 using the sensing value of the IMU sensor 460. At this time, the processor 440 may reorganize image frames (e.g., ToF frame).

The processor 440 may include a local iterative closest point (ICP) module 446 that is capable of generating a point cloud based on the depth information generated by the depth map generator 442 and the camera pose re-localized by the camera pose re-localizer 443.

The local ICP module 446 may generate a bounding box of the object based on the point cloud.

The processor 440 may display the bounding box and numeric information (e.g., length, area, and volume) of the bounding box on the display 430 with a graphic user interface and may store the bounding box and numeric information in the memory 450.

Figure 5:
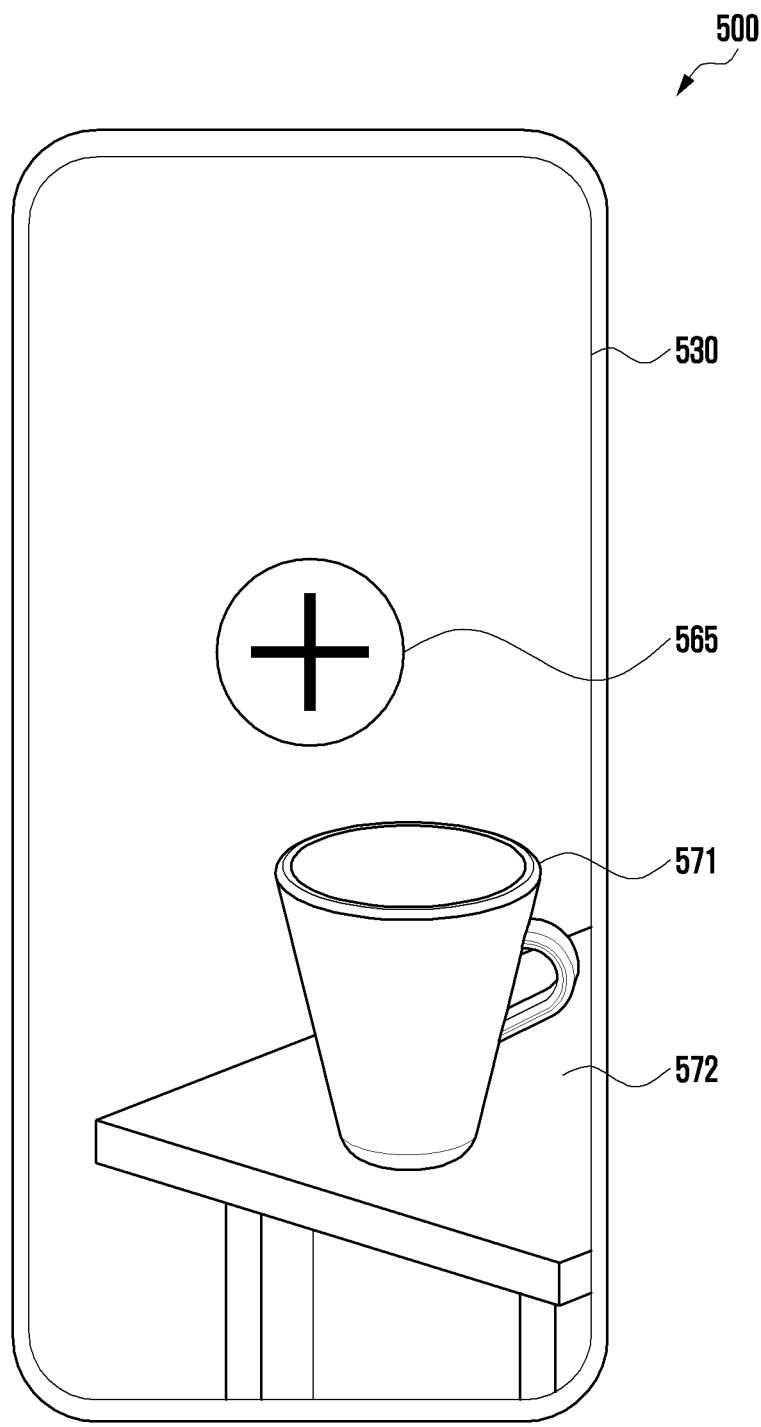
FIG. 5 is a diagram illustrating an exemplary screen display for explaining a procedure for an electronic device to guide targeting of an object to be measured according to a disclosed embodiment.

FIG. 5 is a diagram illustrating an exemplary screen display for explaining a procedure for an electronic device to guide targeting of an object to be measured according to a disclosed embodiment.

In reference to FIG. 5, the user may operate the electronic device 500 to display a real time image of the object, which is taken by the RGB image sensor (e.g., RGB image sensor 320 in FIG. 3), on the display 530. The processor (e.g., processor 340 in FIG. 3) may display a targeting image 565 for guiding arrangement of the object to be measured to be at the center of the screen.

If the user adjusts the angle of the electronic device 500 such that the targeting image 565 is placed at the center of the object, the processor may acquire a first ToF frame by means of a ToF sensor (e.g., ToF sensor 310 in FIG. 3) automatically or in response to a touch input made by the user. The first ToF frame may include information on a cup 571 as the object to be measured and a table 572 on which the cup 571 is placed.

The processor may also acquire an RGB image frame by means of an RGB image sensor.

The processor may acquire first depth information from the first ToF frame. The first depth information may include information on the depths of all objects (e.g., cup 571 and table 572). In this case, the objects may be recognized as a single object because they are in contact with each other.

Figure 6:
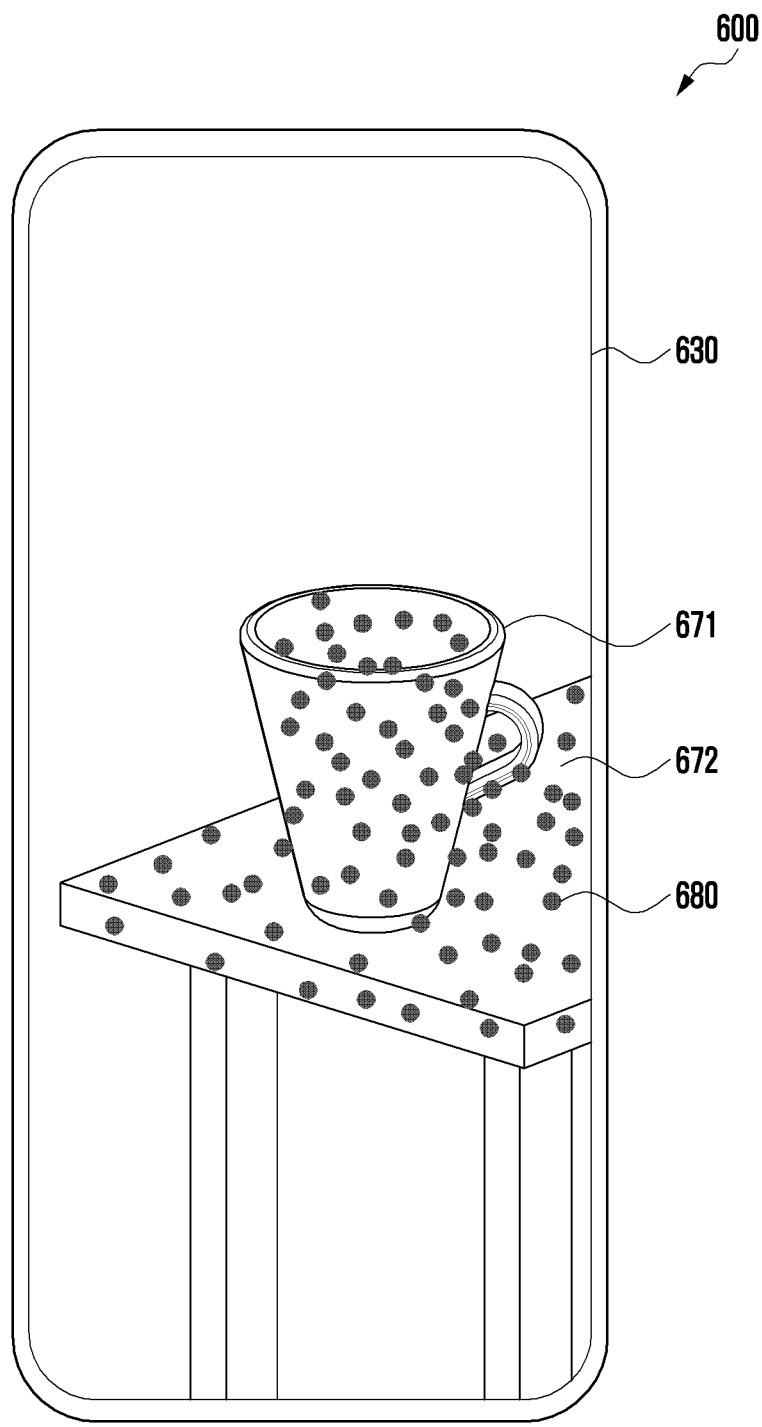
FIG. 6 is a diagram illustrating an exemplary screen display for explaining a procedure for an electronic device to generate a point cloud of an object according to a disclosed embodiment.

FIG. 6 is a diagram illustrating an exemplary screen display for explaining a procedure for an electronic device to generate a point cloud of an object according to a disclosed embodiment.

According to an embodiment, the processor (e.g., processor 340 in FIG. 5) may generate a first point cloud 680 based on first depth information and display the first point cloud 680 on the display 630.

The point cloud may include points constituting a surface of the 3-dimensional object. The points constituting the point cloud may each have coordinate information relative to a reference point.

In reference to FIG. 6, the processor may display the points of the first point cloud 680 on an image taken by the RGB image sensor (e.g., RGB image sensor 320 in FIG. 3) such that the points are overlaid on the objects in the image. Here, the first point cloud 680 may include the points measured on the cup 671 and the table 672 as the objects in the screen.

Figure 7A:
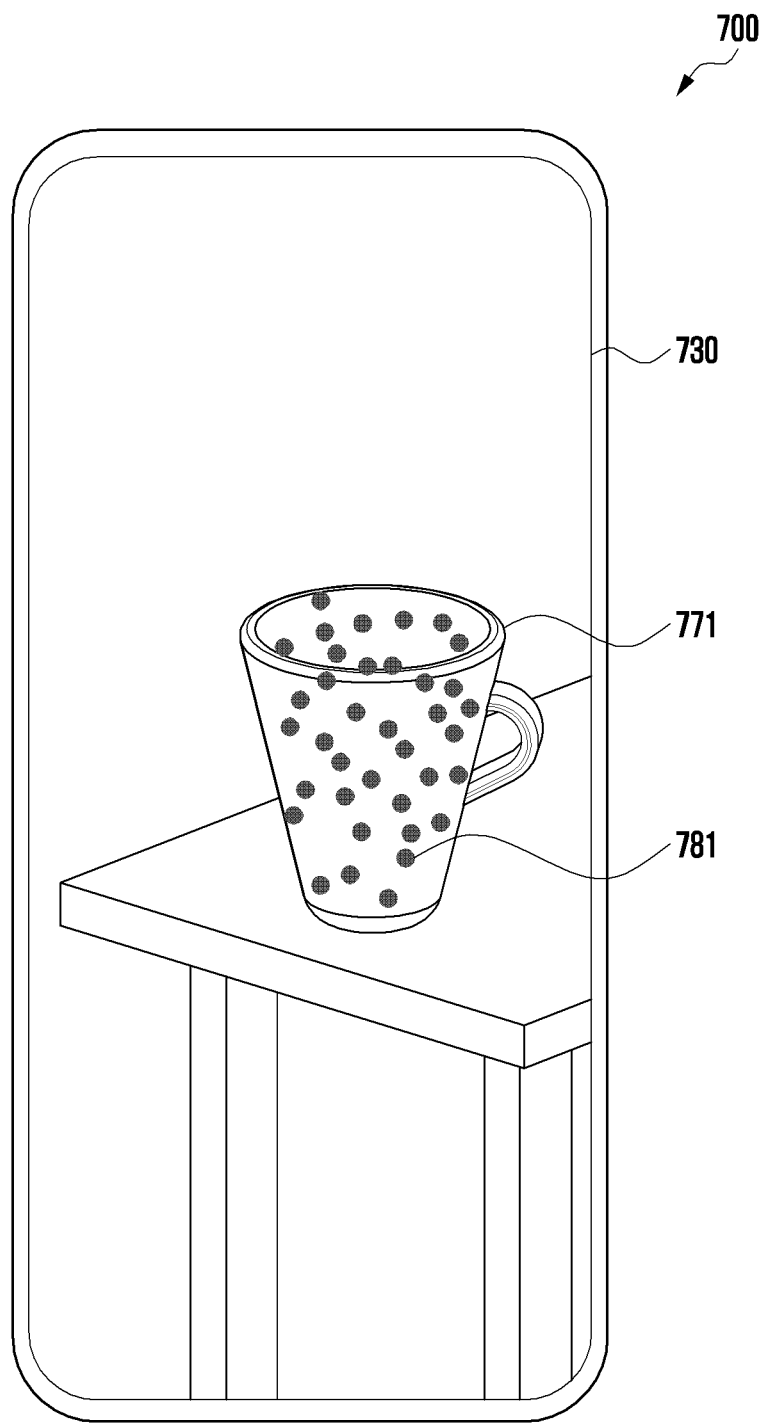
FIGS. 7A and 7B are diagrams illustrating exemplary screen displays for explaining a procedure for an electronic device to remove a reference surface from a point cloud according to a disclosed embodiment.
Figure 7B:
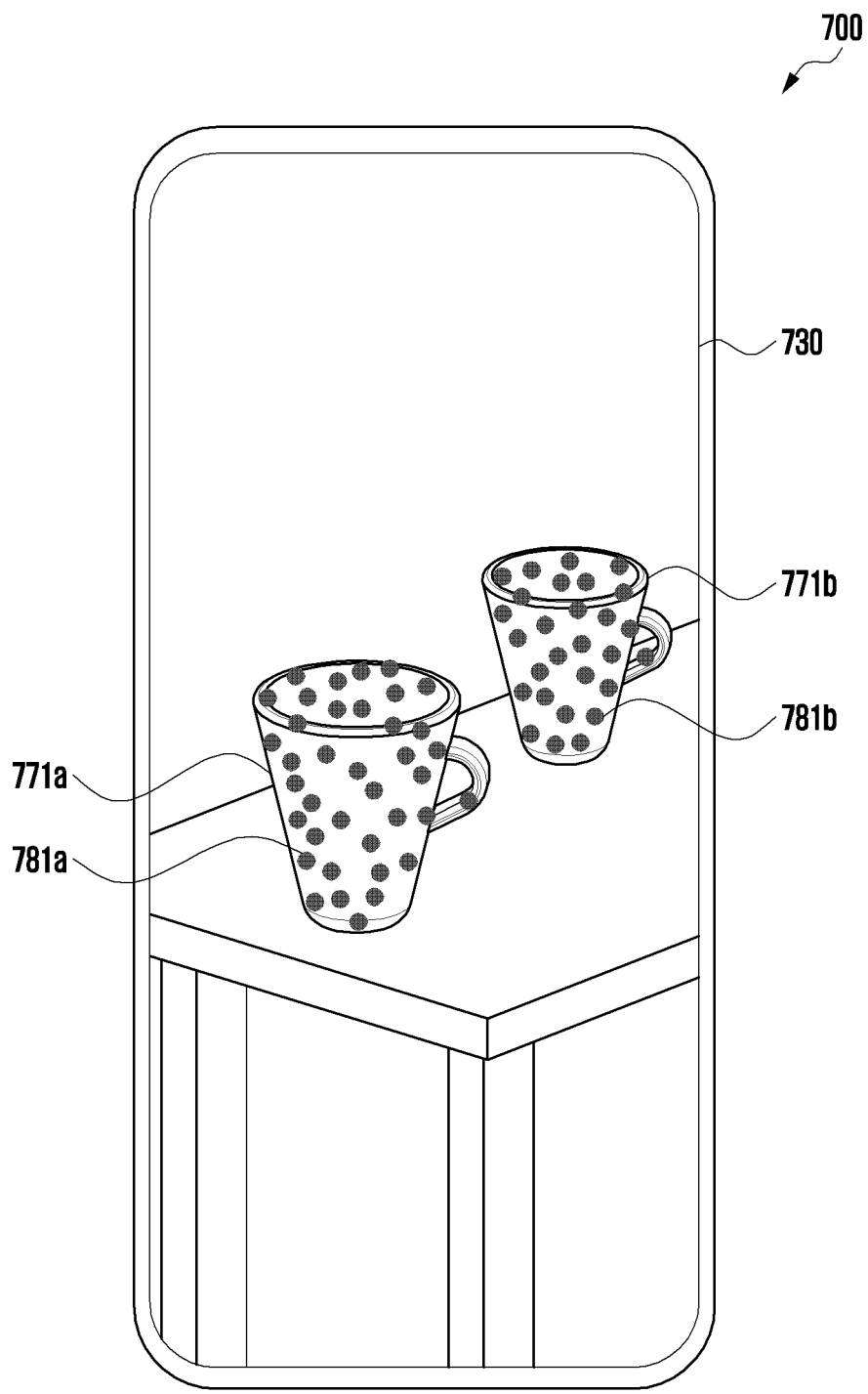

FIGS. 7A and 7B are diagrams illustrating exemplary screen displays for explaining a procedure for an electronic device to remove a reference surface from a point cloud according to a disclosed embodiment.

In reference to FIG. 7A, a first point cloud that is provisionally acquired in the process of measuring the size of the cup 771 placed on a reference surface such as a table may include information on both the cup 771 and the table, even though the object that the user intends to measure is the cup 771.

According to an embodiment, the processor (e.g., processor 340 in FIG. 3) may generate the first point cloud 781 including only the points above the reference surface among the provisional first point cloud generated based on the first depth information. That is, the processor may remove the points at or below the reference surface (e.g., table) among the provisionally generated first point cloud.

According to an embodiment, the processor may detect points having the same normal vector (or being within an error range) in the points constituting the first point cloud 781 and identify the points adjacent to each other, among the points having the same normal vector, based on their coordinate information. Because the points corresponding to the table are all arranged on the same plane, their normal vectors may be perpendicular to the z axis. The processor may identify the points adjacent to each other and having the same normal vector (or being within an error range) as the reference surface.

According to an alternative embodiment, the processor may determine a surface having the largest number of points with the same z axis coordinate value (or within an error range) in the provisionally generated point cloud as the reference surface.

In reference to FIG. 7A, the point cloud 781 of the cup 771 is obtained by removing the reference surface from the provisional point cloud shown in FIG. 6.

In reference to FIG. 7B, in the case where multiple objects are included in the captured image frame (e.g., ToF frame and RGB image frame), the point clouds 781a and 781b of respective objects 771a and 771b may be separated from each other by removing the reference surface.

In this case, the processor may generate the first point clouds 781a and 781b of the separated objects 771a and 771b and then proceed to generate and display bounding boxes for each object.

Figure 8:
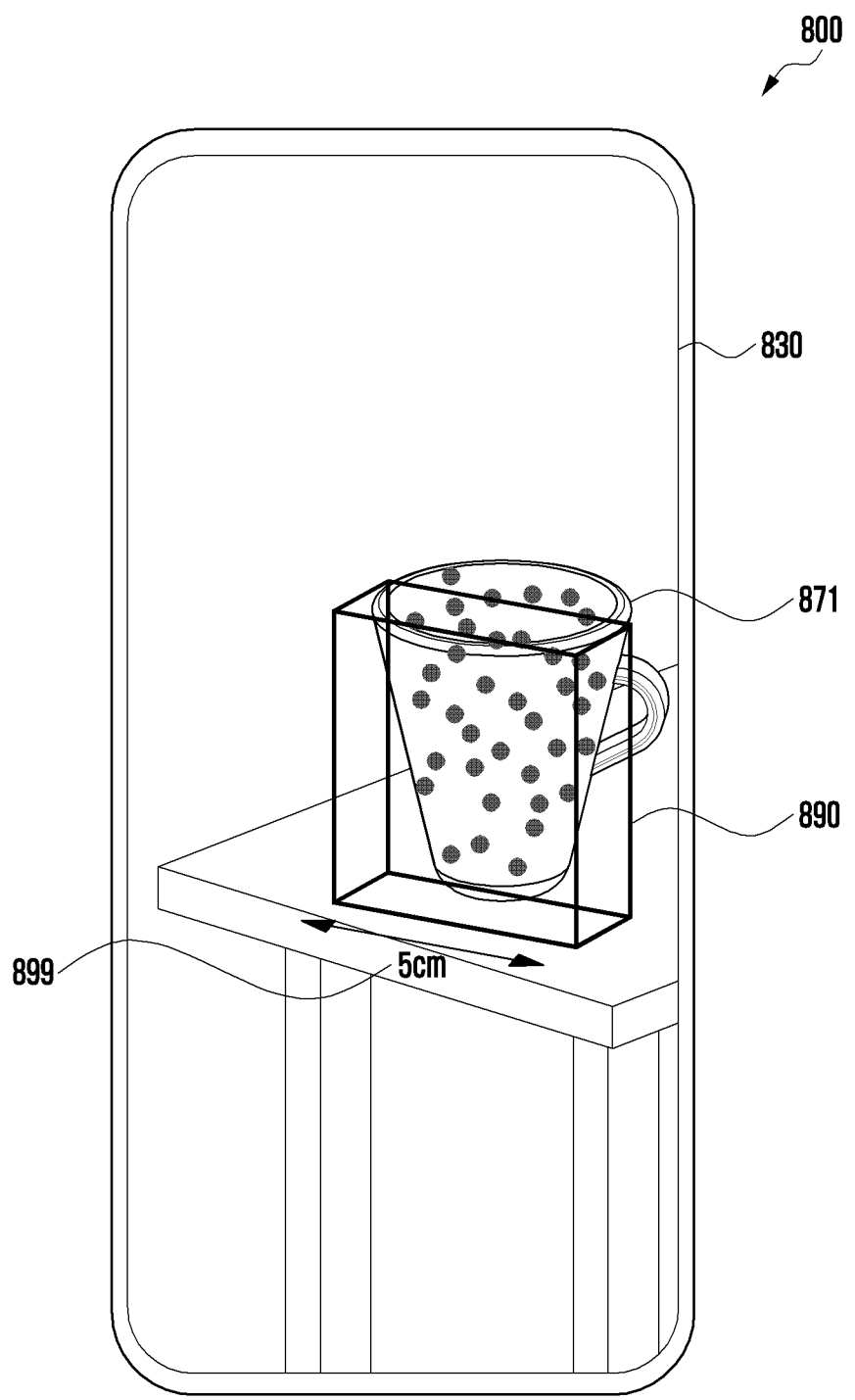
FIG. 8 is a diagram illustrating an exemplary screen display for explaining a procedure for an electronic device to generate a 3-dimensional bounding box according to a disclosed embodiment.

FIG. 8 is a diagram illustrating an exemplary screen display for explaining a procedure for the electronic device to generate a 3-dimensional bounding box according to a disclosed embodiment.

According to an embodiment, a processor (e.g., processor 340 in FIG. 3) may generate a first bounding box 890 based on a first point cloud (e.g., first point cloud 781 in FIG. 7A). The bounding box may be generated in the shape of the smallest cuboid that the object can fit in. For example, the processor may generate the first bounding box 890 based on the smallest and largest coordinate values in the x, y, and z axes that are obtained from the coordinate information of the individual points of the first point cloud.

The processor may display the first bounding box 890 to be overlaid on the image of the object 871.

The processor may display the first bounding box 890 along with numeric information 899. Here, the numeric information 899 may include edge lengths and the volume of the first bounding box 890. The processor may generate the numeric information 899 based on the smallest and largest coordinate values of the point cloud contained in the first bounding box 890.

In reference to FIG. 8, the bounding box generated through the procedures described with reference to FIGS. 5 to 8 may be too small for the object 871 to fit in, i.e., the bounding box may be inaccurate. Measuring the object in this way with only with one ToF frame may generate a bounding box inaccurate in size with respect to the actual object. Likewise, when measuring the object in an excessively dark or bright place or using part of an image (e.g., ToF frame) of the object, an inaccurate bounding box can be generated.

According to an embodiment, if it is determined that the bounding box generated as described above is inaccurate, the electronic device 800 may display guide information prompting the user to move the electronic device 800 to a different location to take another image (or depth information) of the corresponding object.

The description is made hereinafter of the procedure for displaying guide information with reference to FIGS. 9A to 9D.

FIGS. 9A to 9D are diagrams illustrating exemplary screen displays for explaining a procedure for an electronic device to display object measurement-related guide information according to a disclosed embodiment.

According to an embodiment, in the case where a first bounding box 990 generated as described as above differs from the actual region of the object, the processor (e.g., processor 340 in FIG. 3) may display guide information 935 prompting regeneration of the bounding box in a different direction.

Figure 9A:
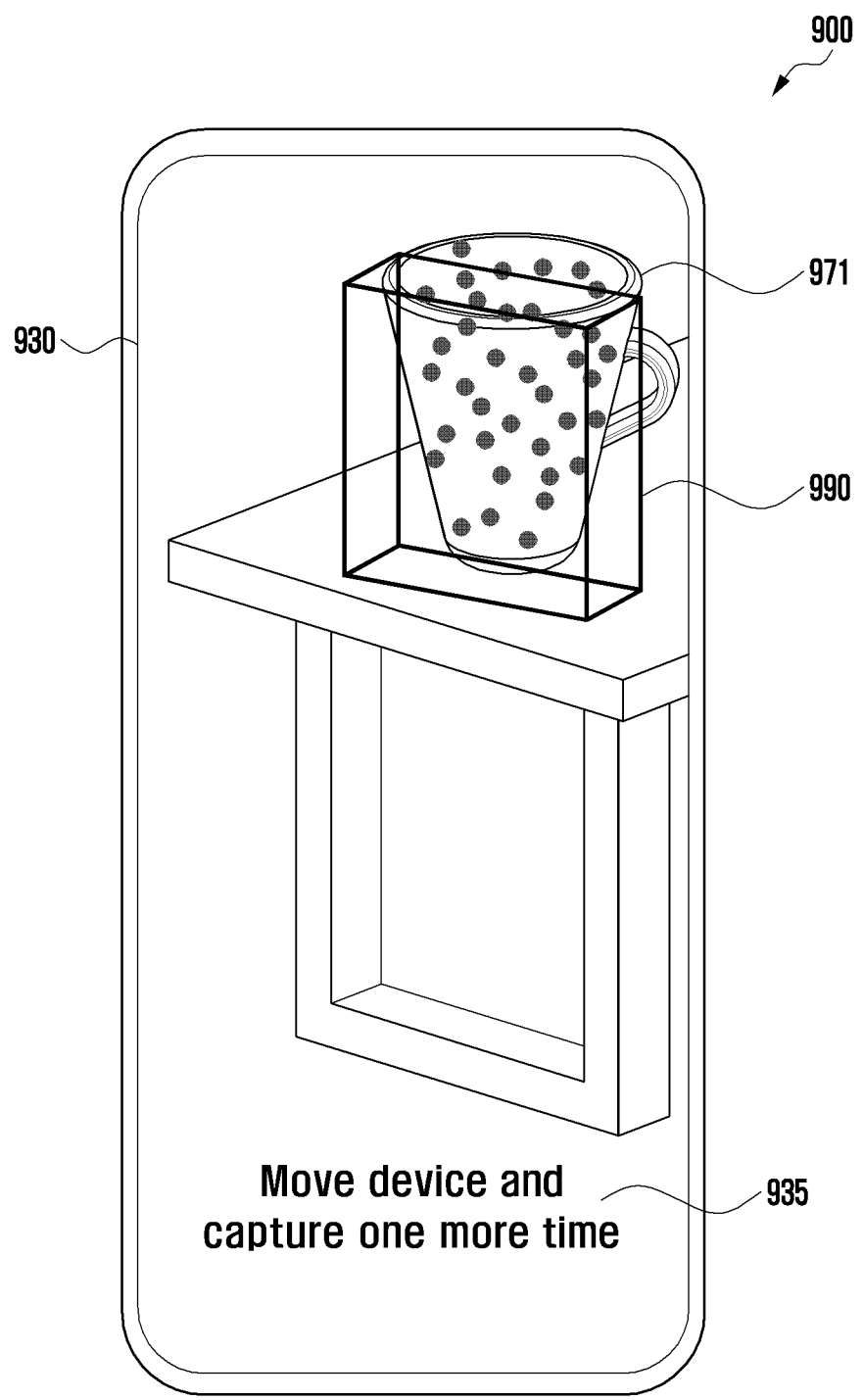
FIGS. 9A to 9D are diagrams illustrating exemplary screen displays for explaining a procedure for an electronic device to display object measurement-related guide information according to a disclosed embodiment.

In reference to FIG. 9A, the first bounding box 990 overlaid on an image of the object 971 taken by the RGB image sensor (e.g., RGB image sensor 320 in FIG. 3) is smaller in size than the actual region of the object 971.

According to an embodiment, the processor may extract a region corresponding to the object 971 in the first RGB image taken by the RGB image sensor, determine that the first bounding box is overlaid on the region of the object 971 in the first RGB image, and compare the size of the overlapping part with a threshold value. If the result of the comparison shows that the size of the overlapping part is less than the threshold value, this means that the first bounding box 990 is inaccurate; thus, the processor may display the guide information 935 on the display 930.

Figure 9B:
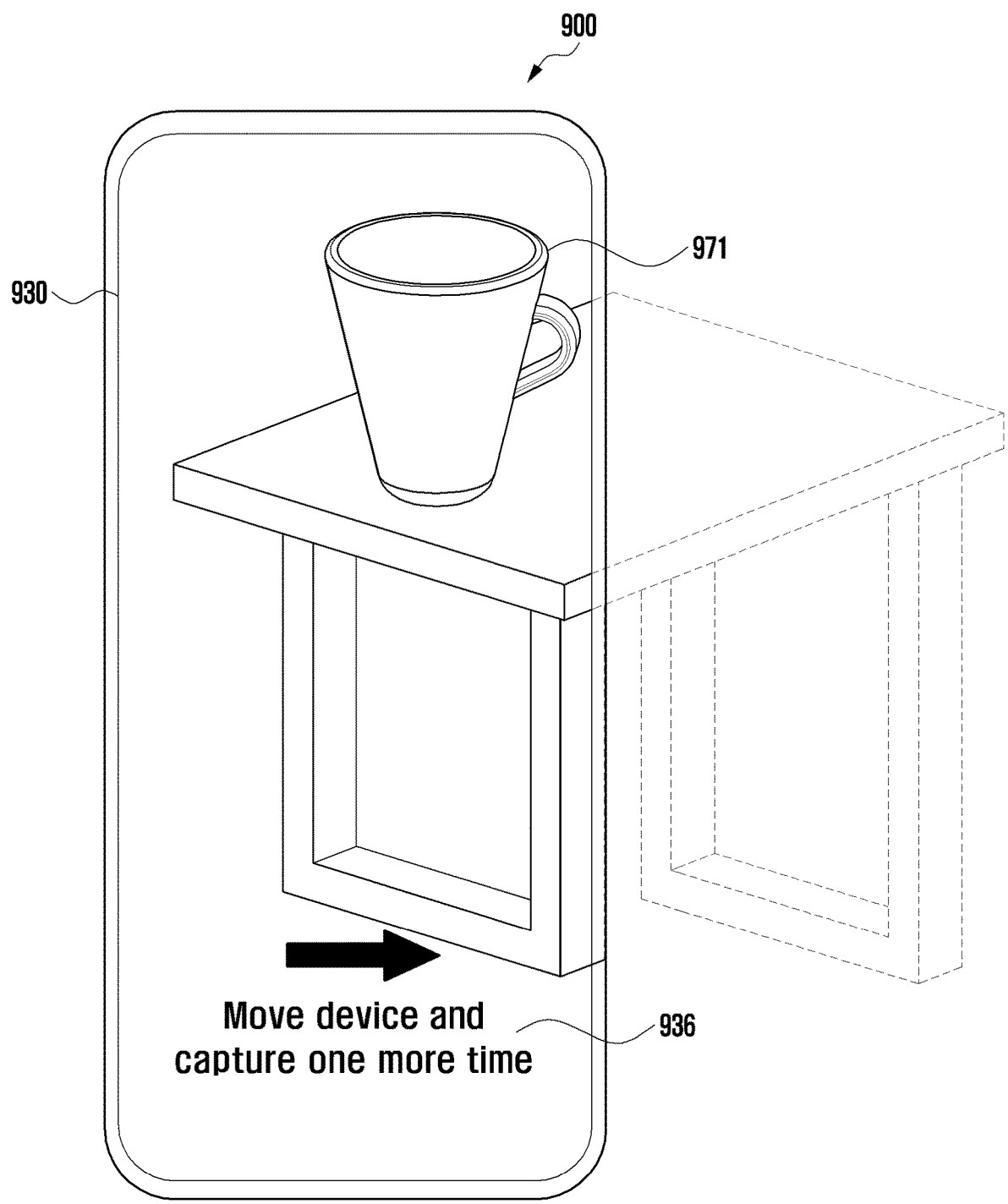

In reference to FIG. 9B, the first bounding box may cover part of the object 971. This is because the object 971 is partly within the viewing angle of the ToF camera when the first ToF frame was acquired for generating first depth information.

According to another embodiment, if it is determined that the region corresponding to the object 971 in the RGB image is partly out of the viewing angle of the RGB image sensor, the processor may display guide information 936 prompting regeneration of the bounding box in a different direction.

Because the ToF sensor and the RGB image sensor are in the electronic device, the ToF sensor and the RGB image sensor may have the same view angle. Accordingly, the processor may determine whether the object is wholly within the viewing angle of the ToF sensor based on the RGB image acquired by the RGB image sensor. The processor may determine whether the object is partly out of the viewing angle based on pixel values at the vertical and horizontal edges of the RGB image.

Figure 9C:
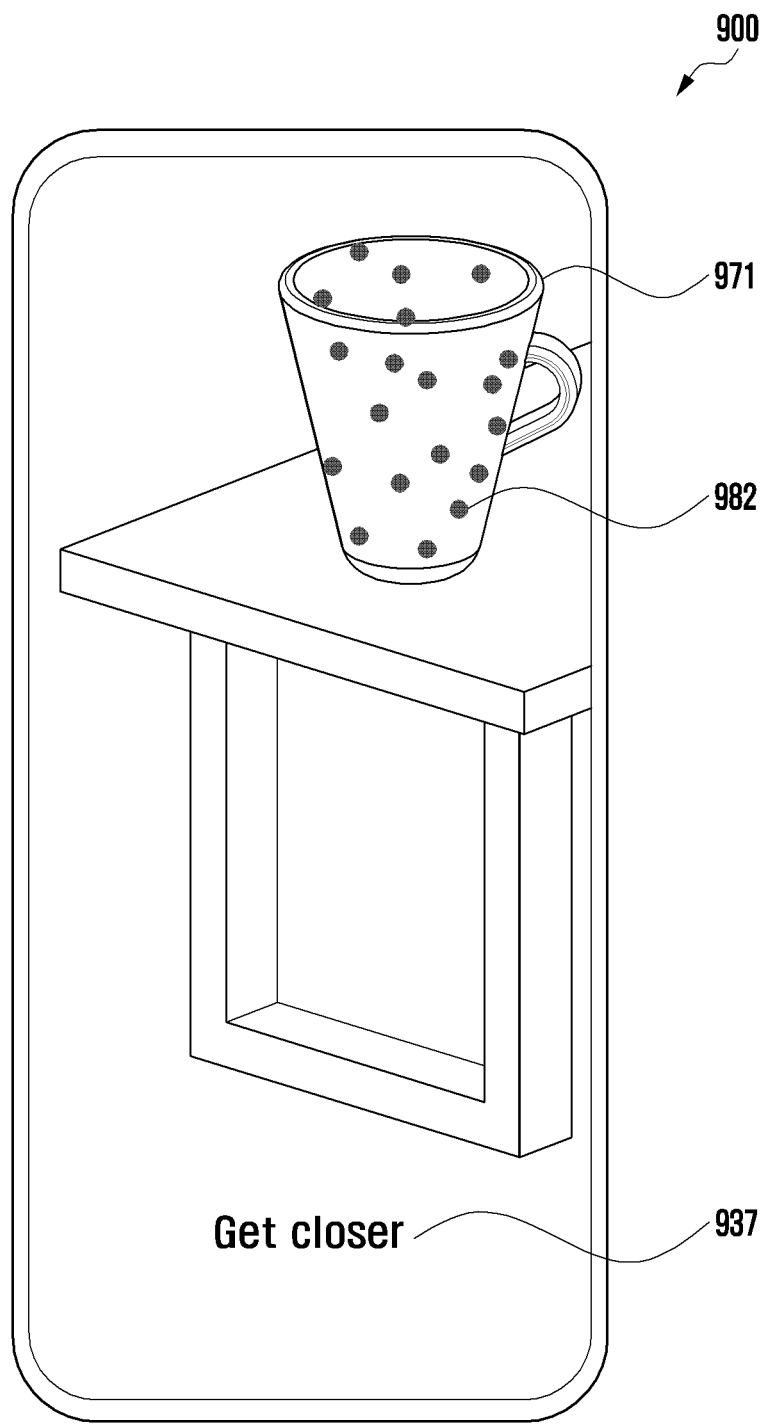

In reference to FIG. 9C, a first point cloud 982 generated as described above may be composed of a relatively small number of points because the electronic device 900 is too far from the object 971.

According to an embodiment, if the number of points of the first point cloud 982 is equal to or less than a threshold, the processor may display guide information 937 on the display 930 prompting regeneration of the bounding box from a shorter distance.

Figure 9D:
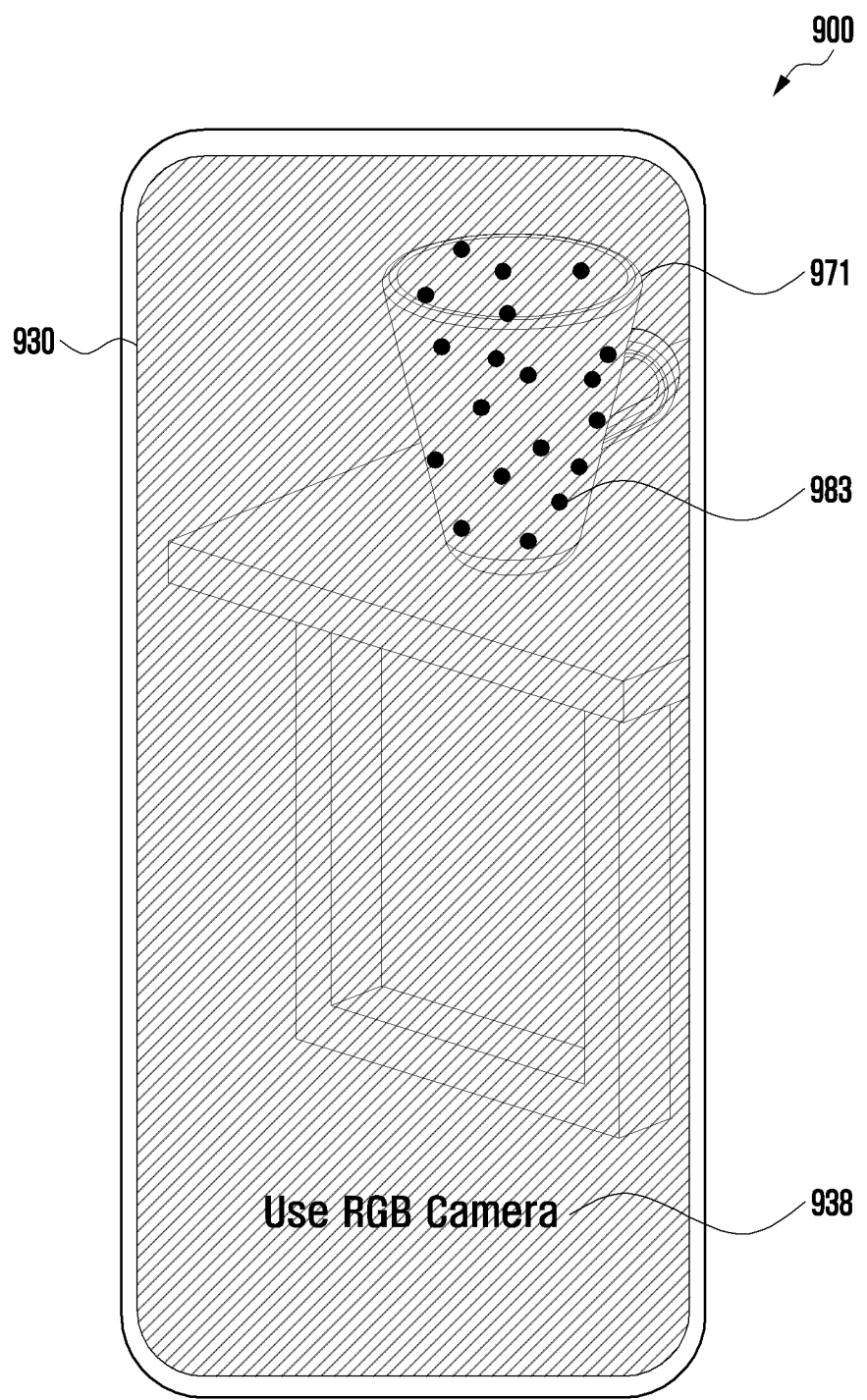

In reference to FIG. 9D, in the case of generating a point cloud 983 of the object 971 when the ambient light is too dark or too bright, the point cloud 983 may be composed of a small number of points because the ToF sensor emits light in the infrared band. In this case, the processor may display guide information 938 prompting use of the RGB image sensor because the RGB image sensor would provide a more accurate point cloud.

According to an embodiment, in the case where the number of points of the first point cloud generated based on the first ToF frame is equal to or less than the threshold, the processor may display guide information prompting use of the RGB image sensor for generating the bounding box on the display. The processor may also check for the ambient brightness based on an RGB image frame taken by the RGB image sensor and, if it is determined that the ambient brightness is too bright or too dark, display guide information 938, on the display, prompting use of the RGB image sensor for generating the bounding box.

Figure 10:
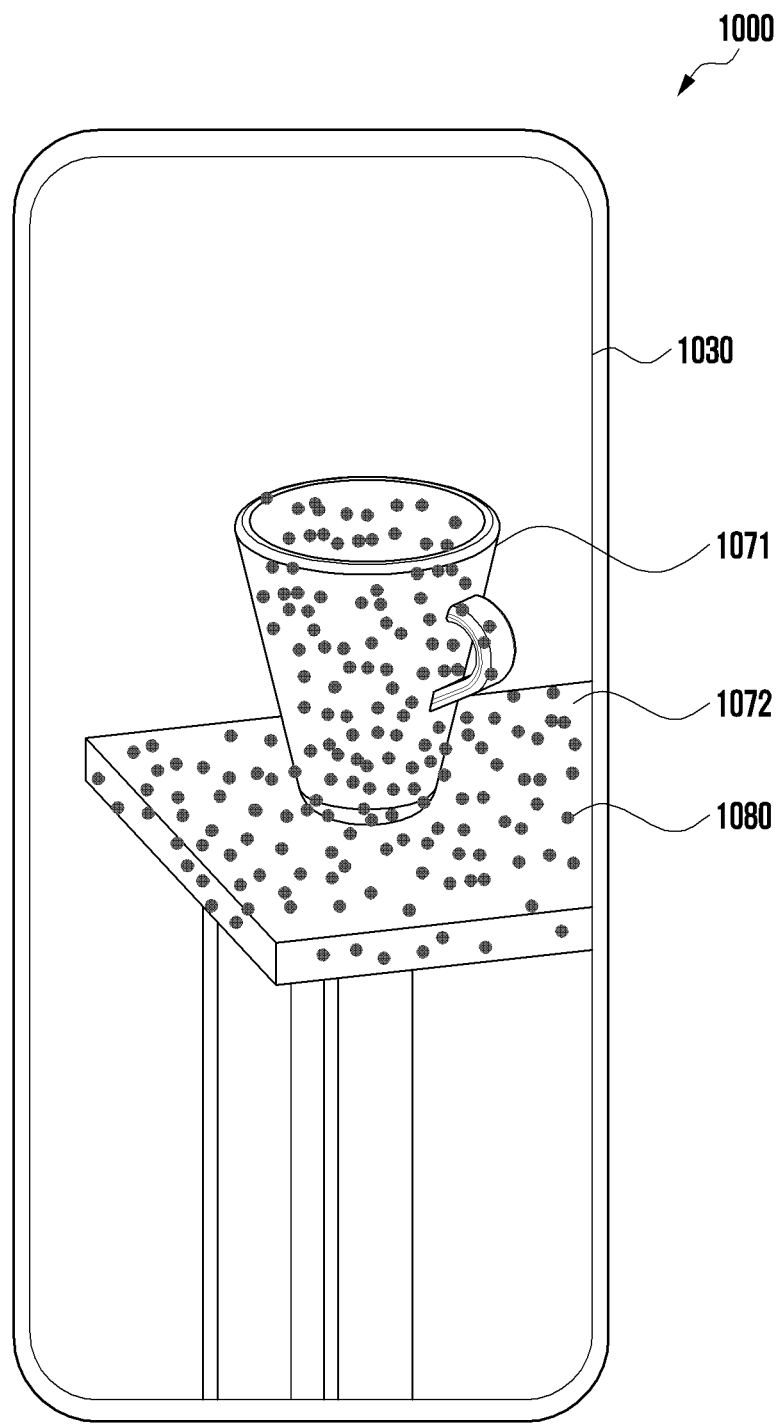
FIG. 10 is a diagram illustrating an exemplary screen display for explaining a point cloud of an object that is generated by an electronic device according to a disclosed embodiment.

FIG. 10 is a diagram illustrating an exemplary screen display for explaining a point cloud of an object that is generated by an electronic device according to a disclosed embodiment.

Figure 11:
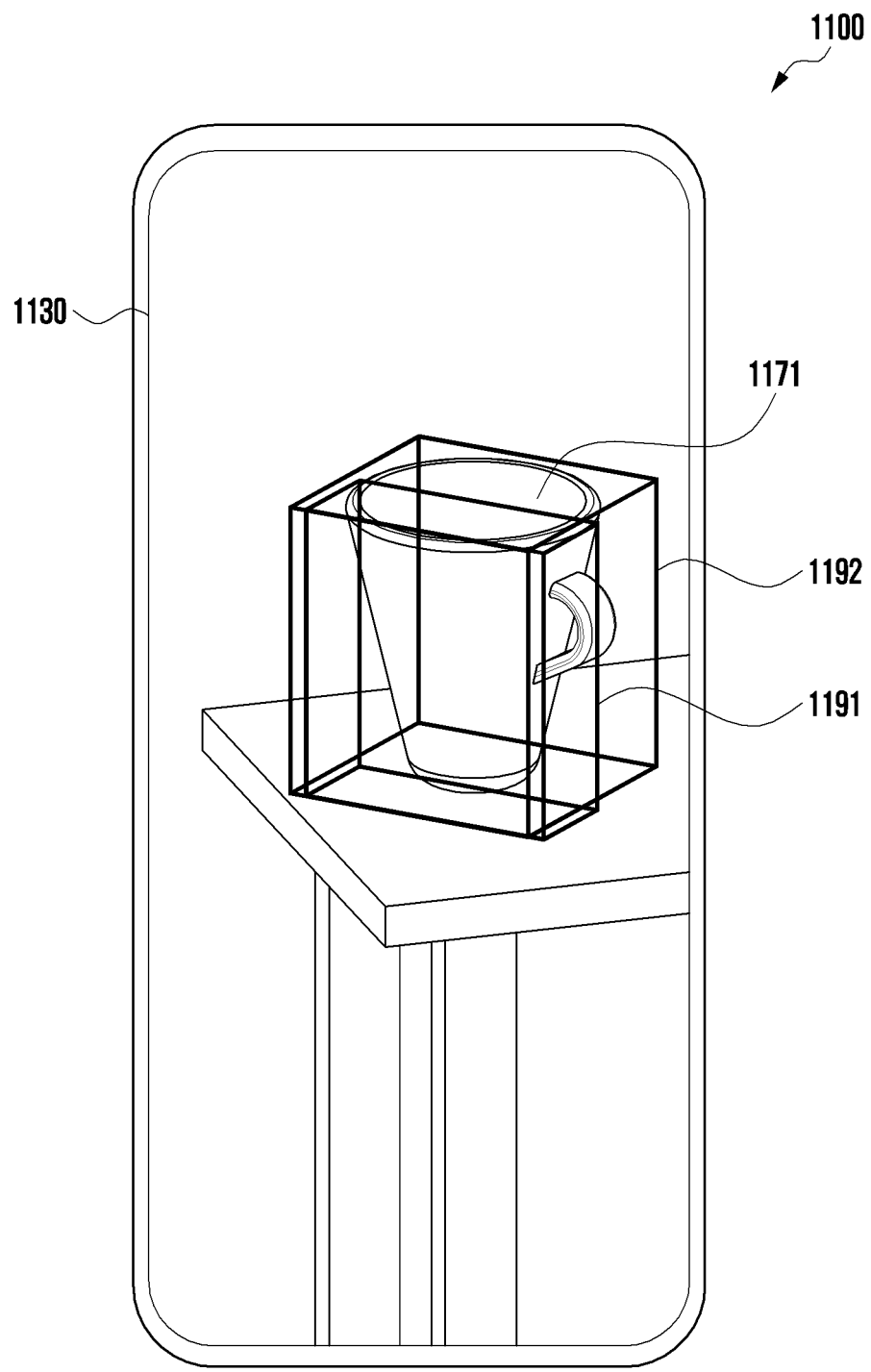
FIG. 11 is a diagram illustrating an exemplary screen display for explaining a procedure for an electronic device to generate two bounding boxes for an object according to a disclosed embodiment.
Figure 12:
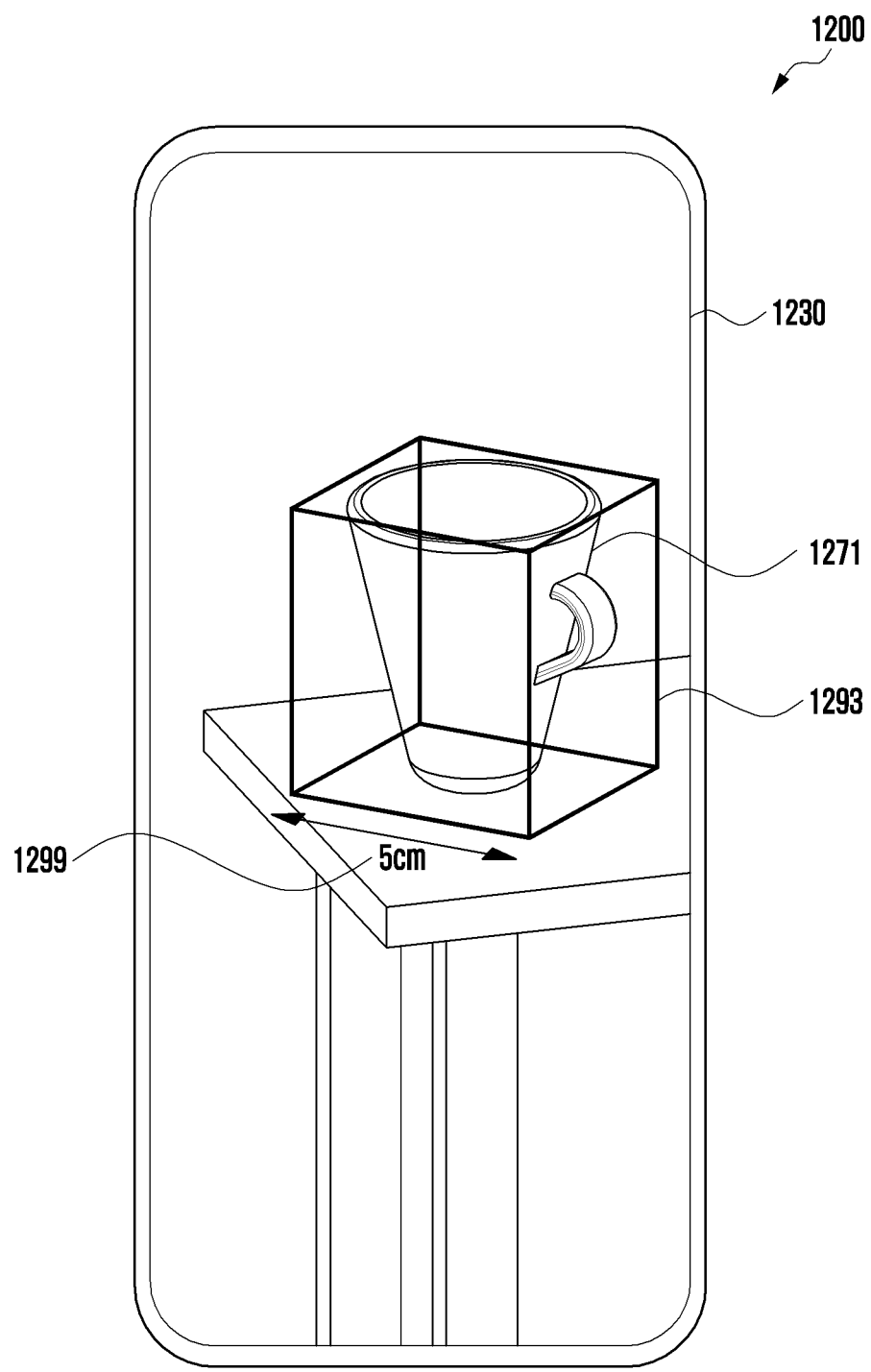
FIG. 12 is a diagram illustrating an exemplary screen display for explaining a procedure for an electronic device to update a bounding box according to a disclosed embodiment.

After displaying a first bounding box (e.g., first bounding box 890 in FIG. 8), the processor may acquire second depth information according to a predetermined logic and/or after displaying the guide information as described with reference to FIGS. 9A to 9D. For example, the user may move the electronic device 1000 to a new location (e.g., second location) to take an image of the object from the new location according to the guide information. In the embodiments of FIGS. 10 to 12, it is assumed that the electronic device is horizontally moved around the object 1071 to measure the object 1071 in a second direction forming a predetermined angle with a first direction. However, the moving direction is not limited to the disclosed embodiments, and the second direction may be a direction tilted upward or downward from the first direction or in the opposite direction of the first direction.

According to an embodiment, the processor may generate the second depth information in the second direction from the object.

The processor may generate a second point cloud 1080 based on the second depth information. The second point cloud 1080 may be generated by using the same procedure as that for the first point cloud.

The processor may display the second point cloud 1080 such that points of the second point cloud 1080 are overlaid on corresponding objects 1071 and 1072.

FIG. 11 is a diagram illustrating an exemplary screen display for explaining a procedure for an electronic device to generate two bounding boxes for an object according to a disclosed embodiment.

A processor (e.g., processor 340 in FIG. 3) may remove a reference surface from a second point cloud (e.g., second point cloud 1080 in FIG. 10) and generate a second bounding box 1192. The second bounding box 1192 may be generated in the same manner as that used for the first bounding box 1191.

In reference to FIG. 11, the electronic device may display the first and second bounding boxes 1191 and 1192 on a display 1130. The first and second bounding boxes 1191 and 1192 may each have an overlapping part overlapping the object and a non-overlapping part that does not overlap the object.

FIG. 12 is a diagram illustrating an exemplary screen display for explaining a procedure for an electronic device to update a bounding box according to a disclosed embodiment.

According to an embodiment, a processor (e.g., processor 340 in FIG. 3) may generate a third bounding box 1293 by combining a first bounding box (e.g., first bounding box 1191 in FIG. 11) and a second bounding box (e.g., second bounding box 1192 in FIG. 11).

The third bounding box 1293 may be in the shape of a cuboid having a size sufficient to fit the first and second bounding boxes. That is, the third bounding box 1293 may be generated based on the smallest and largest of the x-, y-, and z-axis coordinate values of the first and second bounding boxes.

The processor may display the third bounding box on a display 1230 such that the third bounding box is overlaid on an object 1271.

According to an embodiment, the processor may display the third bounding box along with numeric information 1299 of the third bounding box 1293. Here, the numeric information 1299 may include edge lengths and the volume of the third bounding box. The processor may generate the numeric information 1299 based on the smallest and largest coordinate values of points of a point cloud corresponding to the third bounding box 1293.

Figure 13A:
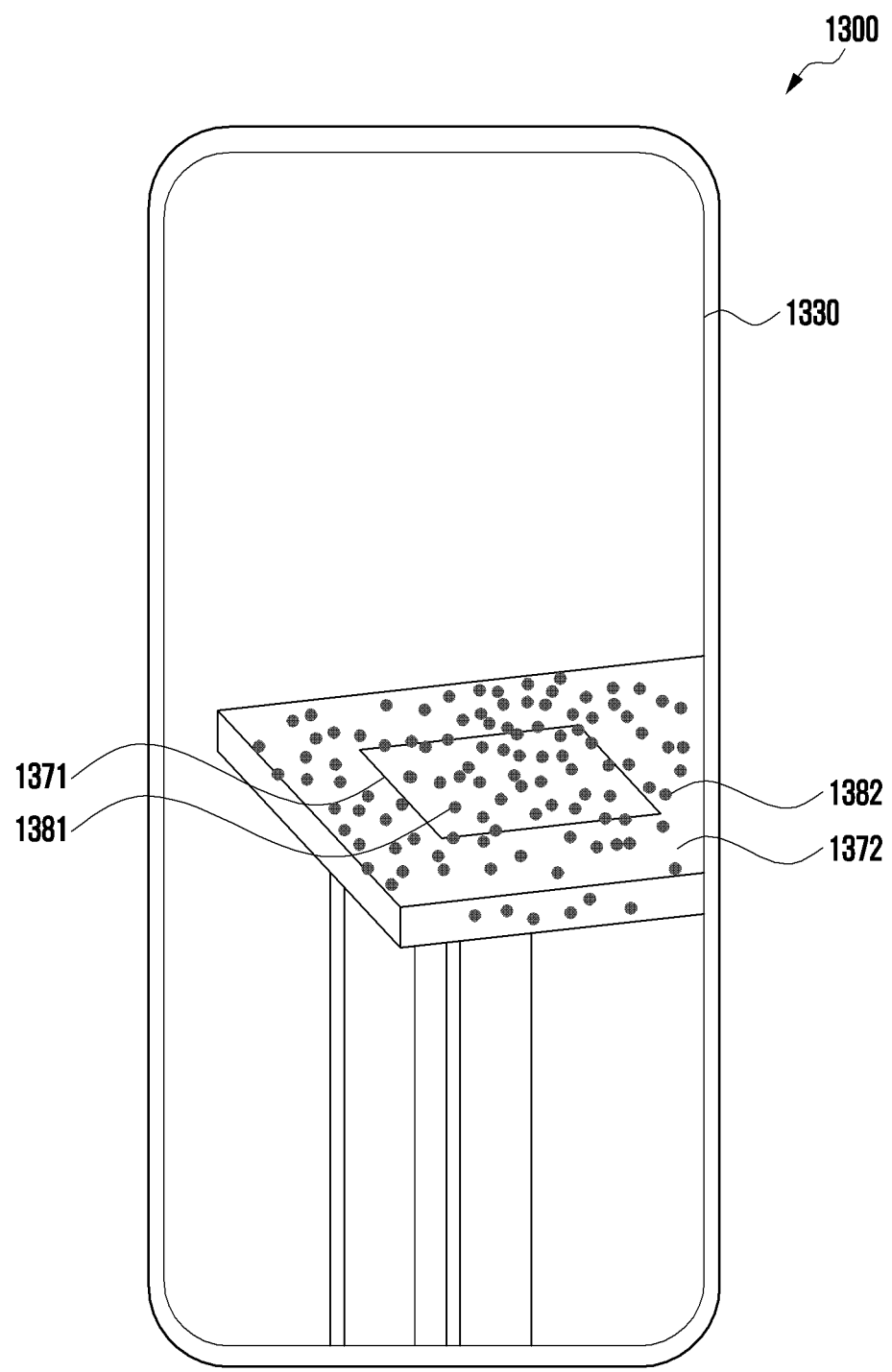
FIGS. 13A and 13B are diagrams illustrating exemplary screen displays for explaining a procedure for an electronic device to generate a bounding box of a 2-dimensional object according to a disclosed embodiment.
Figure 13B:
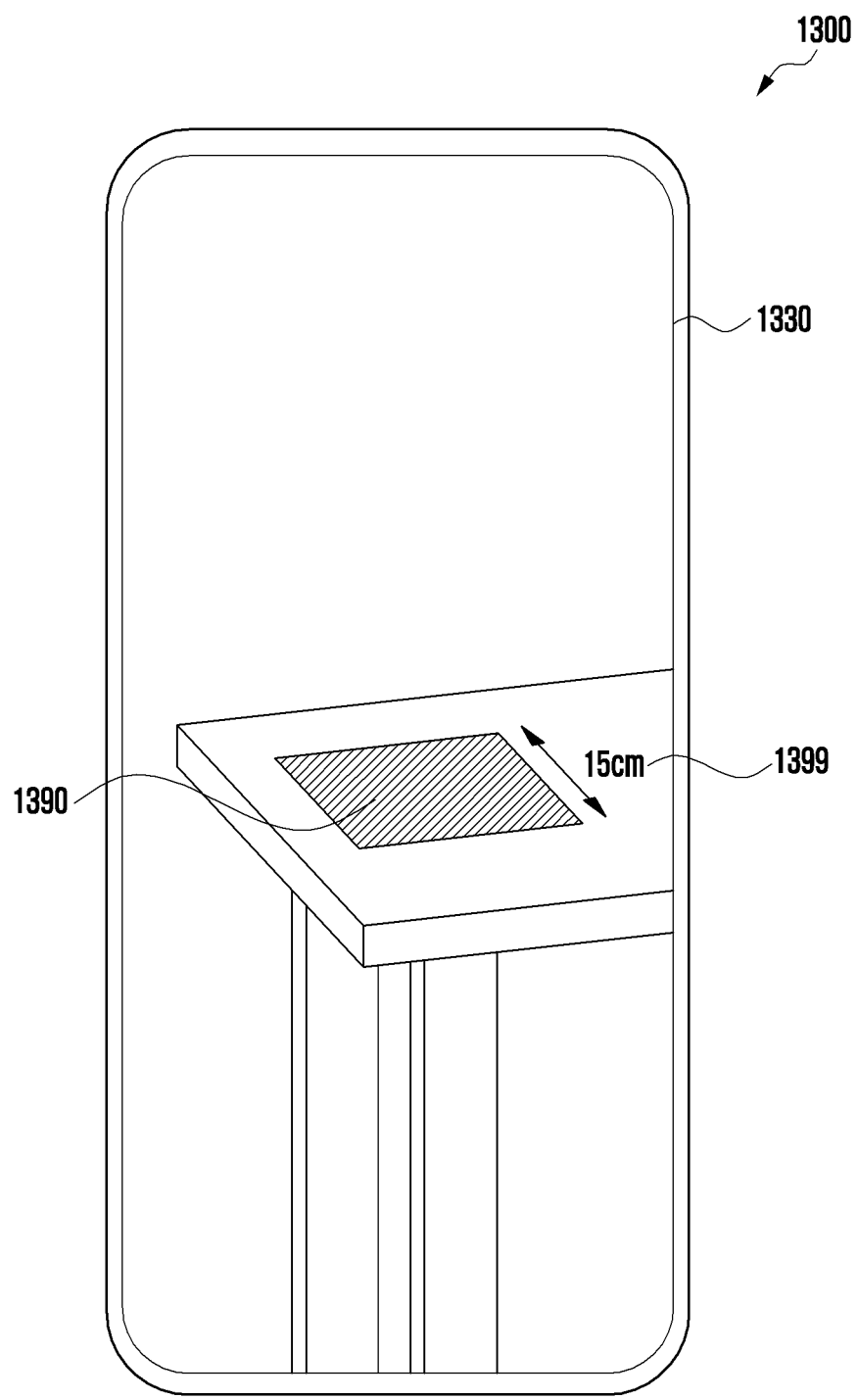

FIGS. 13A and 13B are diagrams illustrating exemplary screen displays for explaining a procedure for an electronic device to generate a bounding box of a 2-dimensional object according to a disclosed embodiment.

According to an embodiment, the electronic device 1300 (e.g., electronic device 300 in FIG. 3) may generate a bounding box for a 2-dimensional object (e.g., rectangle and ellipse) on a plane.

In reference to FIG. 13A, a paper document 1371 may be placed on a table 1372. If no 3-dimensional objects are detected after attempting measurement of 3-D objects using the ToF sensor (e.g., ToF sensor 310 in FIG. 3) and/or the RGB image sensor (e.g., RGB sensor 320 in FIG. 3) or if the user selects a 2-dimensional object measurement option, a processor (e.g., processor 340 in FIG. 3) may perform a process for generating a bounding box for a 2-dimensional object.

The processor may generate a point cloud as denoted by reference numbers 1381 and 1382 based on depth information acquired by means of the ToF sensor and/or the RGB sensor and display the point cloud 1381 and 1382 on a display 1330. The point cloud 1381 and 1382 may include all points corresponding to the paper document 1371 and the table 1372.

The processor may generate a point cloud mask with the points cropped among the generated point cloud that correspond to the paper document 1371 as a 2-dimensional object. For example, the processor may detect an area with a predetermined shape using various edge extraction methods and may generate the point cloud mask by cropping the area.

The processor 340 may generate a 2-dimensional bounding box (e.g., rectangle) based on the smallest and largest x- and y-axis coordinate values of the points of the point cloud mask.

In reference to FIG. 13B, the processor may display the generated bounding box such that the bounding box is overlaid on the image of the paper document 1371 as a 2-dimensional object. According to an embodiment, the processor may display numeric information 1399 including at least one of the side length and/or area of the bounding box of the paper document 1371 as the 2-dimensional object.

According to an embodiment of FIGS. 13A and 13B, the electronic device 1300 is capable of automatically calculating the size of the 2-dimensional object without any intervention of the user for setting up reference points for measurement, unlike conventional technologies. The proposed method is capable of calculating the size of the bounding box accurately even when some depth information is missing.

According to an embodiment, an electronic device 300 may include a display 330, a memory 350, and a processor 340 that is operatively connected to the display 330 and the memory 350. The memory 350 may store instructions that, when executed by the processor, cause the processor to generate first depth information in a first direction from an object, generate a first point cloud of the object based on the first depth information, generate a first bounding box containing one or more points of the first point cloud, generate second depth information in a second direction from the object, the second direction being different from the first direction, generate a second point cloud of the object based on the second depth information, generate a second bounding box containing one or more points of the second point cloud, generate a third bounding box by combining the first and second bounding boxes, and display the third bounding box on the display 330.

According to an embodiment, the instructions may further cause the processor to display numeric information including a volume of the third bounding box and a length of an edge of the third bounding box on the display 330.

According to an embodiment, the instructions may further cause the processor to generate the numeric information based on the smallest and largest coordinate values of points in the third bounding box.

According to an embodiment, the electronic device 300 may further include an RGB image sensor 320, and the instructions may further cause the processor to display the third bounding box on an RGB image including the object that is taken by the RGB image sensor 320.

According to an embodiment, the instructions may further cause the processor to extract the object from a first RGB image taken by the RGB image sensor 320 in the first direction from the object, identify an overlapping region where the first bounding box is overlapped with a region of the object extracted from the first RGB image, and display guide information on the display 330 prompting acquisition of the second depth information in the second direction based on a size of the overlapping region being equal to or less than a threshold.

According to an embodiment, the instructions may further cause the processor to display guide information on the display 330 prompting acquisition of the second depth information in the second direction, the display of the guide information may be based on at least part of the object being out of a viewing angle of an RGB image sensor.

According to an embodiment, the instructions may further cause the processor to display guide information on the display 330 prompting acquisition of the second depth information at a location closer to the object based on a number of points in the first point cloud being equal to or less than a threshold.

According to an embodiment, the instructions may further cause the processor to detect a reference surface in the first point cloud generated based on the first depth information, where the first point cloud includes points above the reference surface.

According to an embodiment, the instructions may further cause the processor to generate multiple first point clouds corresponding to multiple objects separated from each other by removing points in the first point cloud corresponding to the reference surface and generate first bounding boxes corresponding to the multiple objects.

According to an embodiment, the electronic device 300 may further include a time of flight (ToF) sensor 310, and the instructions may further cause the processor to generate the first depth information based on a first ToF frame taken by the ToF sensor 310 in the first direction from the object and generate the second depth information based on a second ToF frame taken by the ToF sensor 310 in the second direction from the object.

According to an embodiment, the electronic device 300 may further include an RGB image sensor 320, and the instructions may further cause the processor to display guide information on the display 330 prompting acquisition of the second depth information using the RGB image sensor 320 based on a number of points in the first point cloud acquired from the first ToF frame being equal to or less than a threshold.

According to an embodiment, the electronic device 300 may further include an RGB image sensor 320, and the instructions may further cause the processor to generate the first depth information based on a first difference between a third RGB frame taken by the RGB image sensor 320 in a third direction from the object and a first RGB frame taken by the RGB image sensor 320 in the first direction from the object and generate the second depth information based a second difference between the first RGB frame and a second RGB frame taken by the RGB image sensor 320 in the second direction from the object.

Figure 14:
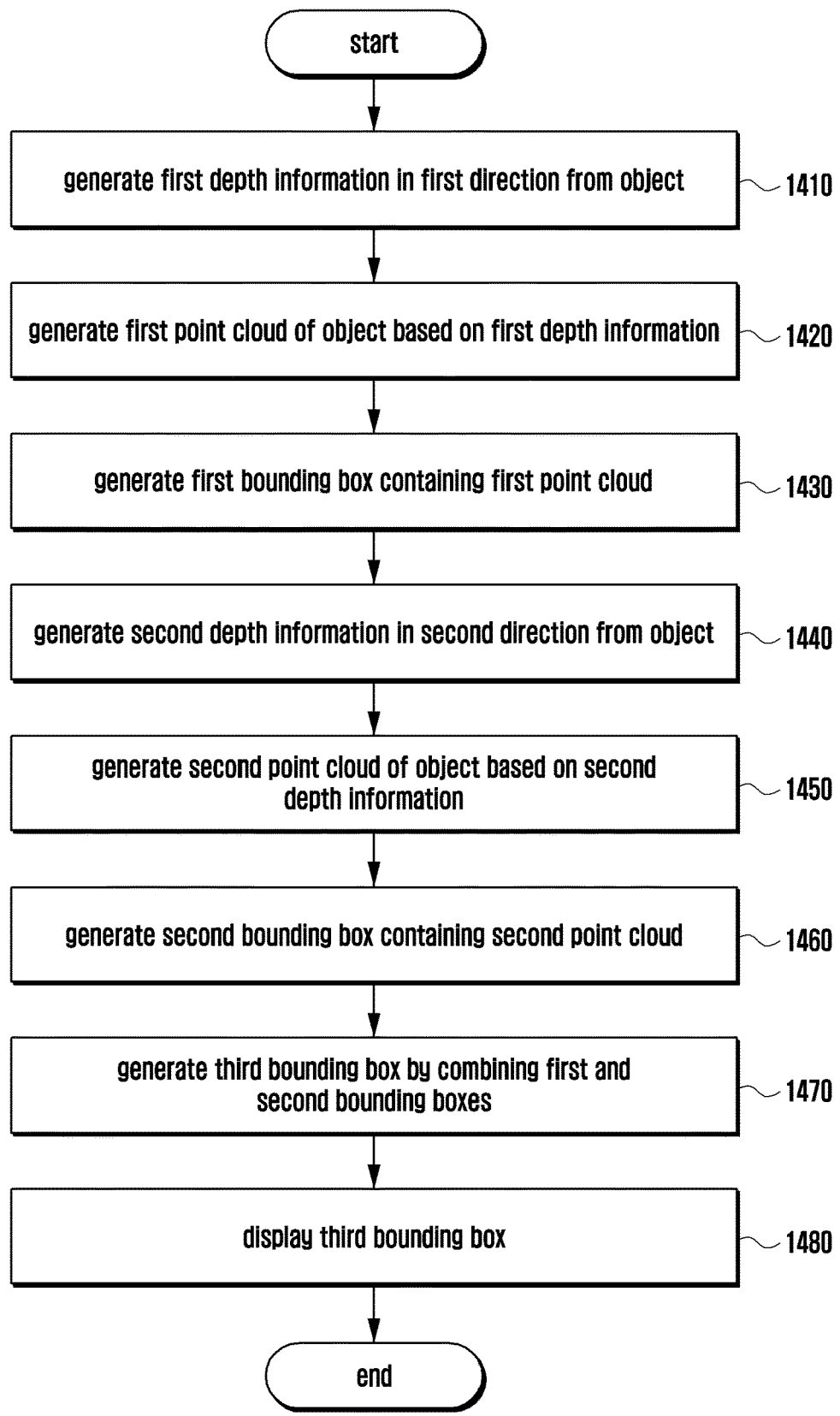
FIG. 14 is a flowchart illustrating an object measurement method of an electronic device according to a disclosed embodiment.

FIG. 14 is a flowchart illustrating an object measurement method of an electronic device according to a disclosed embodiment.

In the embodiment of FIG. 14, the object measurement method may be performed by an electronic device (e.g., electronic device 300 in FIG. 3) described with reference to FIGS. 1 to 12, and the technical features described above are omitted below.

At operation 1410, the electronic device (e.g., electronic device 300 in FIG. 3) may generate first depth information in a first direction from an object (e.g., object 220 in FIG. 2). According to an embodiment, the electronic device may acquire the first depth information of the object by means of a ToF sensor (e.g., ToF sensor 310 in FIG. 3) or an RGB image sensor (e.g., RGB sensor 320 in FIG. 3).

At operation 1420, the electronic device may generate a first point cloud of the object based on the first depth information. According to an embodiment, the electronic device may generate the first point cloud composed of only the points above a reference surface among the point cloud generated based on the first depth information.

At operation 1430, the electronic device may generate a first bounding box containing the first point cloud. The electronic device may generate the first bounding box using the smallest and largest x-, y-, and z-axis coordinate values of the points obtained from the coordinate information of the points constituting the first point cloud.

The electronic device may display the first bounding box such that the first bounding box is overlaid on the object. If it is determined that the first bounding box is inaccurate, the electronic device may display guide information, on a display, prompting generation of a second bounding box in a different direction from the object.

According to an embodiment, if it is determined that the first bounding box differs in part from a region including the actual object, the processor may identify that the first bounding box is inaccurate and display guide information prompting generation of the second bounding box in a different direction.

According to an alternative embodiment, if the object extracted from a first RGB image is partly out of the viewing angle of the RGB image sensor, the processor may display guide information prompting a shift in the location of the electronic device.

According to an alternative embodiment, if the number of points constituting the first point cloud is less than a threshold, the processor may display guide information prompting a shift in the location of the electronic device to be closer to the object.

According to an alternative embodiment, if the number of points constituting the first point cloud acquired from a first ToF frame taken by the ToF sensor 310 is less than a threshold, the processor may display guide information prompting acquisition of depth information with the RGB image sensor.

How to display the guide information has been described with reference to FIGS. 9A to 9D.

At operation 1440, the electronic device may generate second depth information in a second direction from the object. The second depth information may be generated in the same manner as that of the first depth information as described with reference to operation 1410.

At operation 1450, the electronic device may generate a second point cloud of the object based on the second depth information. The second point cloud may be generated in the same manner as that of the first point cloud as described with reference to operation 1420.

At operation 1460, the electronic device may generate a second bounding box containing the second point cloud. The second bounding box may be generated in the same manner as that of the first bounding box as described with reference to operation 1430.

At operation 1470, the electronic device may generate a third bounding box by combining the first and second bounding boxes.

At operation 1480, the electronic device may display the third bounding box. The electronic device may also display numeric information (e.g., edge lengths and volume) of the third bounding box.

According to an embodiment, an object measurement method of an electronic device may include generating first depth information in a first direction from an object, generating a first point cloud of the object based on the first depth information, generating a first bounding box containing one or more points of the first point cloud, generating second depth information in a second direction from the object, the second direction differing from the first direction, generating a second point cloud of the object based on the second depth information, generating a second bounding box containing one or more points of the second point cloud, generating a third bounding box by combining the first and second bounding boxes, and displaying the third bounding box.

According to an embodiment, the method may further include displaying numeric information including a volume of the third bounding box and a length of an edge of the third bounding box.

According to an embodiment, the numeric information may be generated based on the smallest and largest coordinate values of points in the third bounding box.

According to an embodiment, the method may further include extracting the object from a first red, green, and blue (RGB) image taken by an RGB image sensor 320 in the first direction from the object, identifying an overlapping region where the first bounding box is overlapped with a region of the object extracted from the first RGB image, and display guide information prompting acquisition of the second depth information in the second direction based on a size of the overlapping region being equal to or less than a threshold.

According to an embodiment, the method may further include displaying guide information prompting acquisition of the second depth information in the second direction on a display 330, where the displaying of the guide information may be based on at least part of the object being out of a viewing angle of the RGB image sensor 320.

According to an embodiment, the method may further include display guide information prompting to acquire the second depth information at a location closer to the object based on a number of points in the first point cloud being equal to or less than a threshold.

According to an embodiment, the generating of the first point cloud of the object may further include detecting a reference surface in the first point cloud generated based on the first depth information, where the first point cloud may include points above the reference surface.

According to an embodiment, the first depth information may be generated using a time of flight (ToF) sensor 310.

As described above, the electronic device and object measurement method thereof disclosed in the certain embodiments is advantageous because the electronic device can automatically and accurately measuring the size of a real-world object and guiding the user to a more accurate measurement method.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a display;
a memory; and
a processor operatively connected to the display and the memory,
wherein the memory stores instructions that, when executed by the processor, cause the processor to:
generate first depth information in a first direction from an object,
generate a first point cloud of the object based on the first depth information,
generate a first bounding box containing one or more points of the first point cloud,
extract the object from a first red, green, and blue (RGB) image and identify an overlapping region where the first bounding box is overlapped with a region of the object extracted from the first RGB image,
display guide information on the display based on a size of the overlapping region being equal to or less than a first threshold,
in response to the electronic device being moved in response to the guide information, generate second depth information in a second direction from the object, the second direction being different from the first direction,
generate a second point cloud of the object based on the second depth information,
generate a second bounding box containing one or more points of the second point cloud,
generate a third bounding box by combining the first and second bounding boxes, and
display the third bounding box on the display.

2. The electronic device of claim 1, wherein the instructions further cause the processor to display numeric information including a volume of the third bounding box and at least one length of an edge of the third bounding box on the display.

3. The electronic device of claim 1, further comprising a red, green, and blue (RGB) image sensor,
wherein the instructions further cause the processor to display the third bounding box on an RGB image including the object that is taken by the RGB image sensor.

4. The electronic device of claim 1, wherein the instructions further cause the processor to display the guide information prompting acquisition of the second depth information in the second direction based on at least part of the object being out of a viewing angle of a red, green, and blue (RGB) image sensor.

5. The electronic device of claim 1, wherein the instructions further cause the processor to display the guide information prompting acquisition of the second depth information at a location closer to the object on the display based on a number of points in the first point cloud being equal to or less than a second threshold.

6. The electronic device of claim 1, wherein the instructions further cause the processor to:
determine, in the first point cloud of the object, points having normal vectors within an error range of a reference normal vector; and
detect a reference surface in the first point cloud, the reference surface including the points having the normal vectors within the error range of the reference normal vector, and wherein the first point cloud includes points above the reference surface.

7. The electronic device of claim 1, further comprising a time of flight (ToF) sensor,
wherein the instructions further cause the processor to generate the first depth information based on a first ToF frame taken by the ToF sensor in the first direction from the object and generate the second depth information based on a second ToF frame taken by the ToF sensor in the second direction from the object.

8. The electronic device of claim 1, further comprising a red, green, and blue (RGB) image sensor,
wherein the instructions further cause the processor to:
generate the first depth information based on a first difference between a third RGB frame taken by the RGB image sensor in a third direction from the object and a first RGB frame taken by the RGB image sensor in the first direction from the object, and
generate the second depth information based a second difference between the first RGB frame and a second RGB frame taken by the RGB image sensor in the second direction from the object.

9. The electronic device of claim 2, wherein the instructions further cause the processor to generate the numeric information based on smallest and largest coordinate values of points in the third bounding box.

10. The electronic device of claim 3, wherein the first RGB image is taken by the RGB image sensor in the first direction from the object, and
wherein the guide information prompts acquisition of the second depth information in the second direction on the display.

11. The electronic device of claim 6, wherein the instructions further cause the processor to:
generate multiple first point clouds corresponding to multiple objects separated from each other by removing points in the first point cloud corresponding to the reference surface, and
generate first bounding boxes corresponding to the multiple objects.

12. The electronic device of claim 7, further comprising a red, green, and blue (RGB) image sensor,
Wherein the instructions further cause the processor to display the guide information prompting acquisition of the second depth information using the RGB image sensor based on a number of points in the first point cloud acquired from the first ToF frame being equal to or less than a third threshold.

13. An object measurement method of an electronic device, the method comprising:
generating first depth information in a first direction from an object;
generating a first point cloud of the object based on the first depth information;
generating a first bounding box containing one or more points of the first point cloud;
extracting the object from a first red, green, and blue (RGB) image and identifying an overlapping region where the first bounding box is overlapped with a region of the obj ect extracted from the first RGB image,
displaying guide information on the display based on a size of the overlapping region being equal to or less than a first threshold,
in response to the electronic device being moved in response to the guide information, generating second depth information in a second direction from the object, the second direction being different from the first direction;
generating a second point cloud of the object based on the second depth information;
generating a second bounding box containing one or more points of the second point cloud;
generating a third bounding box by combining the first and second bounding boxes; and
displaying the third bounding box.

14. The method of claim 13, further comprising displaying numeric information including a volume of the third bounding box and at least one length of an edge of the third bounding box.

15. The method of claim 13,
wherein the RGB image is taken by an RGB image sensor in the first direction from the object; and
wherein the guide information prompts ing acquisition of the second depth information in the second direction.

16. The method of claim 13, further comprising the guide information prompting acquisition of the second depth information in the second direction is displayed based on at least part of the object being out of a viewing angle of an RGB image sensor.

17. The method of claim 13, further comprising displaying the guide information prompting acquisition of the second depth information at a location closer to the object based on a number of points in the first point cloud being equal to or less than a second threshold.

18. The method of claim 13, wherein the generating of the first point cloud of the object further comprises:
   determining, in the first point cloud of the object, points having normal vectors within an error range of a reference normal vector; and
   detecting a reference surface in the first point cloud, the reference surface including the points having the normal vectors within the error range of the reference normal vector, and wherein the first point cloud includes points above the reference surface.

19. The method of claim 13, wherein the first depth information is generated using a time of flight (ToF) sensor.

20. The method of claim 14, wherein the numeric information is generated based on smallest and largest coordinate values of points in the third bounding box.

* * * * *